US009519385B2

(12) United States Patent
Akai et al.

(10) Patent No.: US 9,519,385 B2
(45) Date of Patent: Dec. 13, 2016

(54) SEMICONDUCTOR DEVICE AND ELECTRONIC DEVICE

(71) Applicant: Synaptics Display Devices GK, Tokyo (JP)

(72) Inventors: Akihito Akai, Tokyo (JP); Tatsuya Ishii, Tokyo (JP); Toshikazu Tachibana, Tokyo (JP); Toshiyuki Takani, Tokyo (JP)

(73) Assignee: Synaptics Display Devices GK, Tokyo (JP)

( * ) Notice: Subject to any disclaimer, the term of this patent is extended or adjusted under 35 U.S.C. 154(b) by 340 days.

(21) Appl. No.: 14/085,893

(22) Filed: Nov. 21, 2013

(65) Prior Publication Data

US 2014/0146010 A1   May 29, 2014

(30) Foreign Application Priority Data

Nov. 29, 2012   (JP) ................................ 2012-261021

(51) Int. Cl.
   *G06F 3/044*   (2006.01)
   *G06F 3/041*   (2006.01)

(52) U.S. Cl.
   CPC ............ *G06F 3/044* (2013.01); *G06F 3/0416* (2013.01); *G06F 2203/04112* (2013.01)

(58) Field of Classification Search
   CPC ................... G06F 3/0416; G06F 3/044; G06F 2203/04112
   USPC ...................... 345/173–179; 178/18.01–18.09
   See application file for complete search history.

(56) References Cited

U.S. PATENT DOCUMENTS

| 2007/0257890 | A1  | 11/2007 | Hotelling et al. |
| 2010/0302180 | A1* | 12/2010 | Chang ..................... G06F 3/045 345/173 |
| 2010/0328257 | A1* | 12/2010 | Noguchi ................. G06F 3/044 345/174 |
| 2011/0096023 | A1* | 4/2011  | Shih ...................... G06F 3/0412 345/174 |
| 2011/0242048 | A1* | 10/2011 | Guedon .................. G06F 3/044 345/174 |

(Continued)

OTHER PUBLICATIONS

Japanese Office Action for corresponding Japanese Patent Application No. 2012-261021.

*Primary Examiner* — Amare Mengistu
*Assistant Examiner* — Stacy Khoo
(74) *Attorney, Agent, or Firm* — Miles & Stockbridge P.C.

(57) ABSTRACT

The touch panel controller is connected with a touch panel having a plurality of drive electrodes, a plurality of detection electrodes, and a plurality of capacitance components formed at intersections of the drive and detection electrodes. A two-edge detection mode is adopted for the touch panel controller, in which signals arising on each detection electrode in synchronization with rising and falling edges of a drive pulse output to the drive electrodes, and alternately changing in polarity are accumulated in the integration circuit in terms of absolute value components. The integration circuit switches the connection of the integration capacitance between an input and an output before the drive pulse edge changing. The touch panel controller contributes to the shortening of the time for touch detection by the touch panel and the increase of the accuracy of touch detection.

26 Claims, 12 Drawing Sheets

(56) References Cited

U.S. PATENT DOCUMENTS

2012/0287081 A1* 11/2012 Akai ................. G06F 3/044
  345/174
2013/0099804 A1* 4/2013 Kim ................. H03K 17/962
  324/679

* cited by examiner

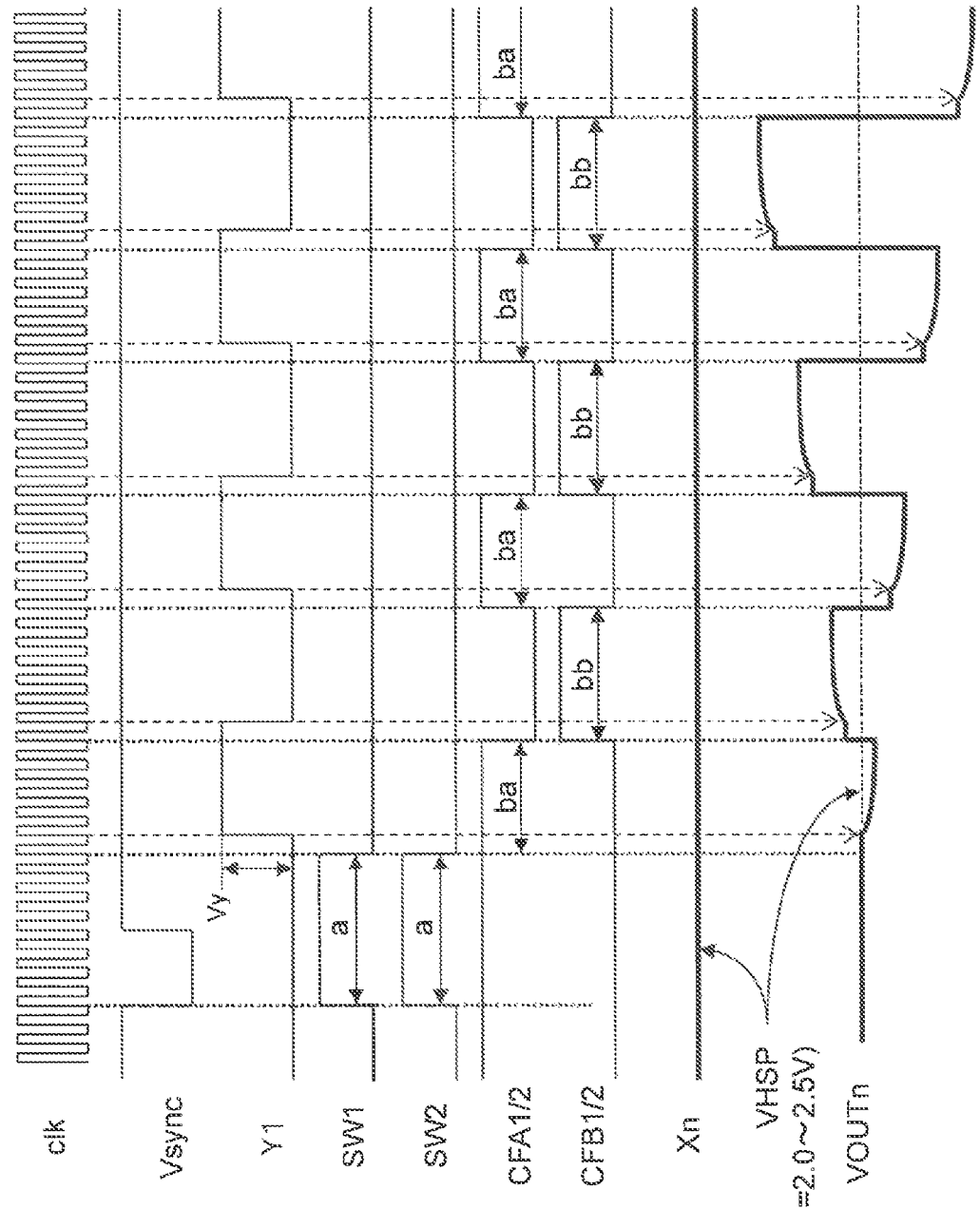

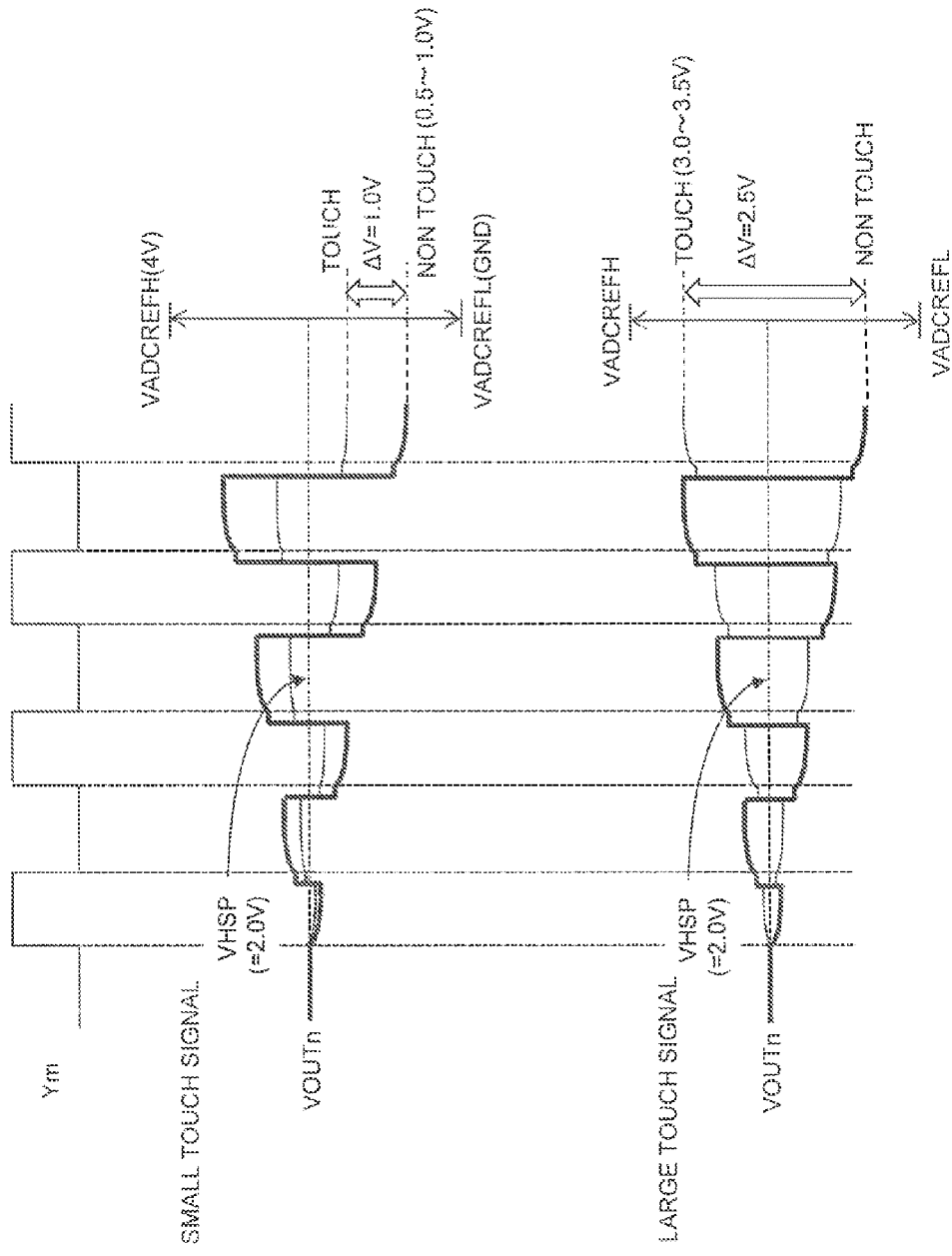

Fig.12

| | Register(TPC_EGMODE) | |
|---|---|---|
| | 1'b0 | 1'b1 |
| Detection Mode | SingleEdge | DualEdge |

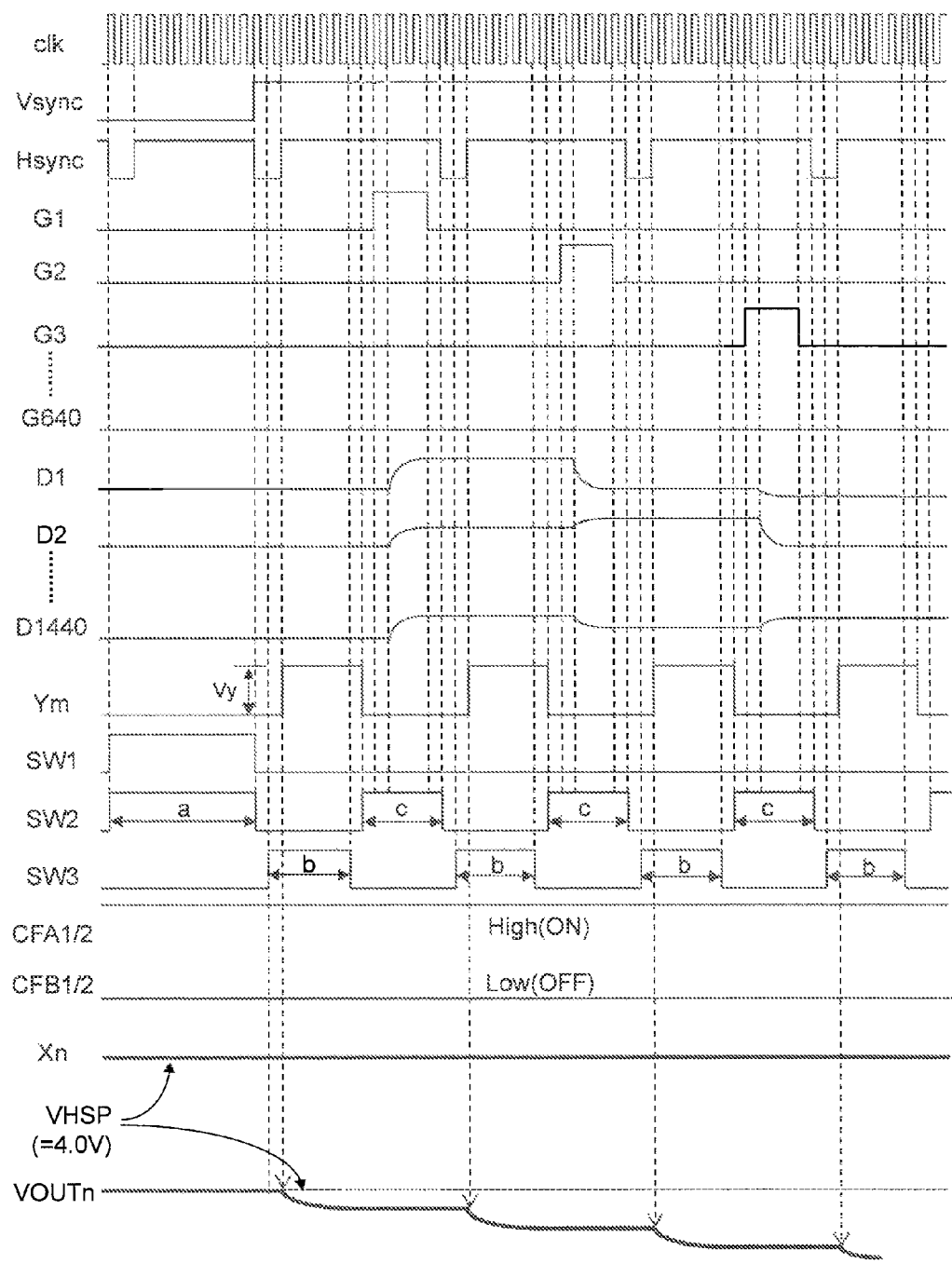

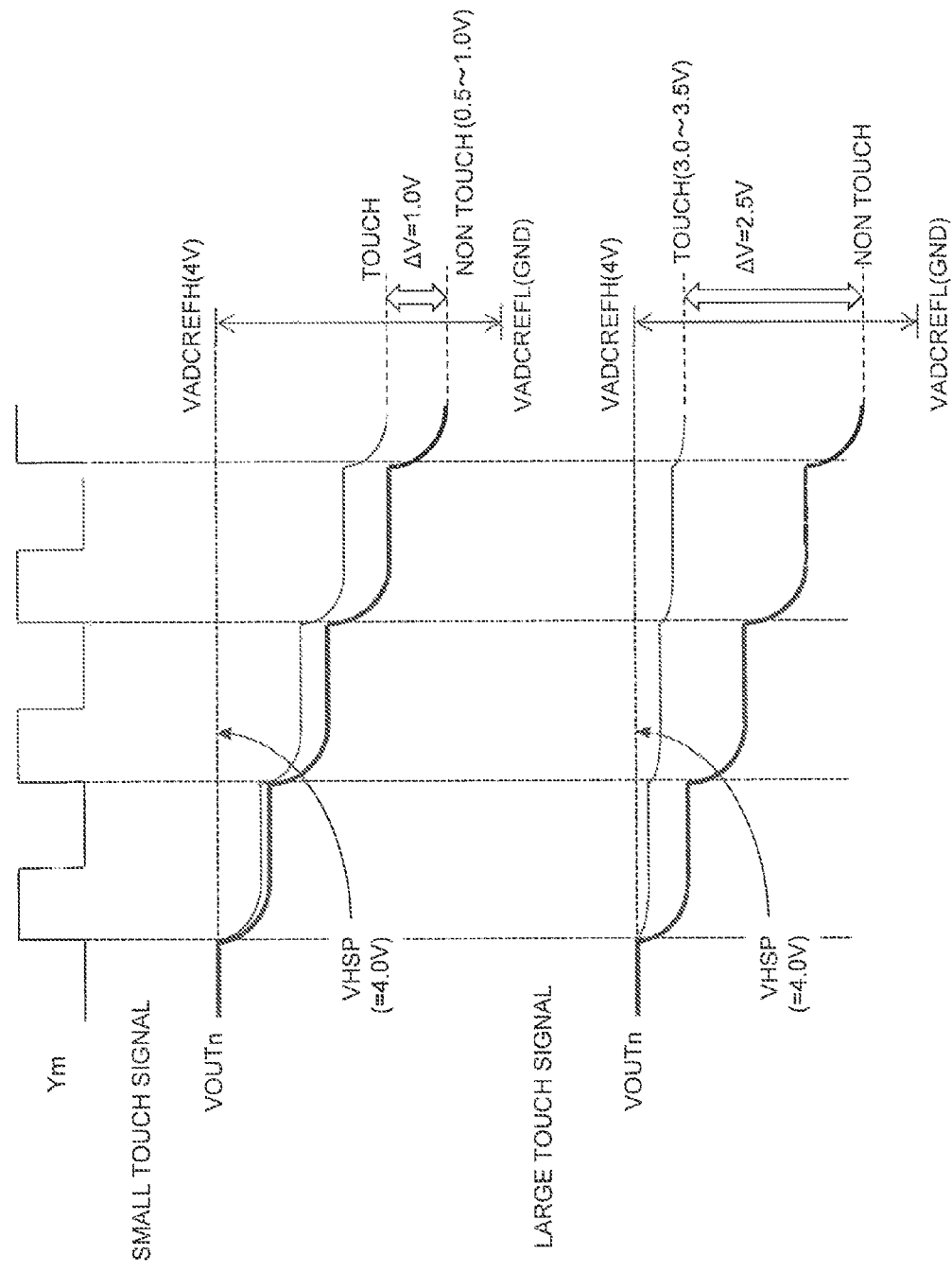

SEMICONDUCTOR DEVICE AND ELECTRONIC DEVICE

CROSS-REFERENCE TO RELATED APPLICATIONS

The Present application claims priority from Japanese application JP 2012-261021 filed on Nov. 29, 2012, the content of which is hereby incorporated by reference into this application.

BACKGROUND

The present invention relates to a semiconductor device having a touch panel controller operable to control a touch panel, and an electronic device having a touch panel controller and a microprocessor, and a technique useful in application to e.g. a portable terminal device having an in-cell touch panel incorporated in a liquid crystal panel.

In a touch panel supporting a multipoint touch according to a mutual capacitance technique, for example, drive electrodes and detection electrodes are arranged to intersect with each other at e.g. right angles with dielectric interposed therebetween; the cross-coupling capacitance of each intersection makes a node capacitance. When a capacitance produced by a finger or hand arises in the vicinity of each node capacitance, the mutual capacitance of the node decreases by an amount corresponding to a combined capacitance attributed to the finger or hand. To detect the node capacitance which the change in mutual capacitance has been caused on, the touch panel controller sequentially activates the drive electrodes by use of pulses, integrates, as a signal, a change in voltage developed on each of the detection electrodes capacitively coupling with the drive electrodes, and acquires a signal resulting from the integration for each detection electrode as a signal corresponding to a change in mutual capacitance among the node capacitances arranged so as to form a matrix. A controller which drives a touch panel and detects signals means of the mutual capacitance technique like this has been already disclosed in, for instance, U.S. Patent Application Publication No. US 2007/0257890 A1.

PTL 1: U.S. Patent Application Publication No. US 2007/0257890 A1

SUMMARY

In a technique for touch detection by means of mutual capacitance, the action of integrating a signal of the change in voltage developed on detection electrodes capacitively coupling with drive electrodes is arranged so that a required signal amount can be achieved by changing a drive pulse in pulse multiple times and integrating a signal developed on the detection electrodes as typified by the technique as described in U.S. Patent Application Publication No. US 2007/0257890 A1. The increase in the number of times that the drive pulse is changed in pulse increases the integration signal amount, but elongates the detection time in proportion to it.

A touch panel with a larger size and an increased touch panel electrode density needs larger number of drive electrodes for touch detection, which makes shorter the time allowed for detection with each electrode. Therefore, in such touch panel, it can be difficult to obtain a required integration signal amount.

A touch panel serving as an input device in a portable terminal device or the like is used in combination with a liquid crystal panel. The forms of combination of a touch panel and a liquid crystal panel is roughly classified into: an externally attaching form in which a touch panel is externally attached to a liquid crystal panel as a separate part; and an in-cell form in which a touch panel is built in a liquid crystal panel. In any combination form, the action of detecting a touch and no touch by a touch panel are performed during a display action by a liquid crystal panel and therefore, it is required to prevent a drive signal of the liquid crystal panel from making noise in the detecting action of the touch panel. For instance, in the case of performing, in time-division method, the action of switching between the driving of scan electrodes of a liquid crystal panel, and gradation data driving signal electrodes, and the action for detection in a touch panel, the time allowed for the detecting action of the touch panel becomes shorter. The higher the gradation level of a liquid crystal panel, the longer the time for display action. Therefore, it is expected that the time allowed for the detecting action of a touch panel is still further shortened.

It is an object of the invention to contribute to shortening of the time for touch detection by a touch panel, and the improvement of the accuracy of touch detection.

The above and other problems and novel features will become apparent from the description hereof, and the accompanying drawings.

Of the embodiments herein disclosed, the representative embodiment will be briefly outlined below.

The touch panel controller is connected with a touch panel having a plurality of drive electrodes, a plurality of detection electrodes, and a plurality of capacitance components formed at intersections of the drive and detection electrodes. A two-edge detection mode is adopted for the touch panel controller, in which signals arising on each detection electrode in synchronization with rising and falling edges of a drive pulse output to the drive electrodes, and alternately changing in polarity are accumulated in the integration circuit in terms of absolute value components. The integration circuit switches the connection of the integration capacitance between an input and an output before the drive pulse edge changing.

Of the embodiment herein disclosed, the representative embodiment brings about the effect as briefly described below.

That is, by using the two-edge detection mode, the number of signal accumulations can be increased in comparison to the case of using only one edge of a drive pulse to perform a detecting action on the assumption that the length of time during which signals are accumulated is common to them; to achieve the same number of accumulations, the detection time can be shortened. Therefore the device of the invention contributes to the shortening of the touch-detection time of a touch panel and to the increase of the accuracy of touch detection.

BRIEF DESCRIPTION OF THE DRAWINGS

FIG. 7 is a timing diagram showing, by example, the timing of a detecting action on the Y-electrode Ym according to a two-edge detection mode;

FIG. 8 is a waveform diagram showing, by example, a transition waveform of the output voltage VOUTn of an integration circuit together with the drive pulse in the case of having performed the detecting action according to the two-edge detection mode;

FIG. 12 is an explanatory diagram showing, by example, a truth table used when switching, by means of a register, between the two-edge detection mode according to the two-edge detection method, and the one-edge detection mode according to the one-edge detection method;

FIG. 13 is a timing diagram showing, by example, the action timing when the one-edge detection mode is adopted; and FIG. 14 is a waveform diagram showing, by example, the waveform of the output voltage VOUTn of the integration circuit in the case of having performed one-edge detection.

DETAILED DESCRIPTION

1. Summary of the Embodiments

Figure 1:
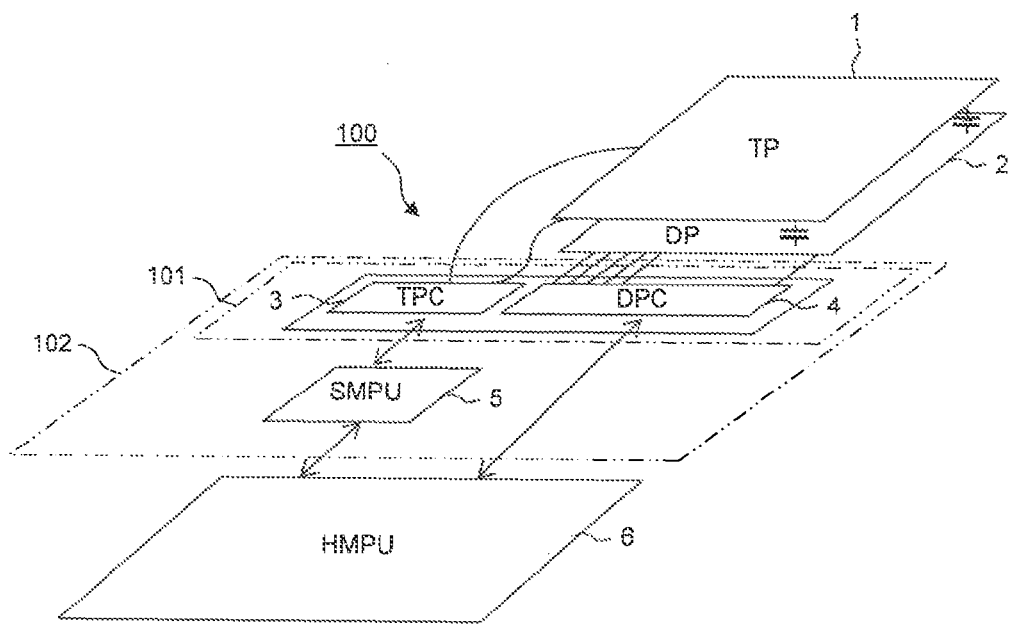
FIG. 1 is a block diagram showing the whole structure of a display-input device which is an embodiment of an electronic device according to the invention.

The embodiments herein disclosed will be outlined, first. Here, the reference numerals, characters and abbreviations for reference to the drawings, which are accompanied with paired round brackets, only exemplify what the concepts of members or components referred to by the numerals, characters and abbreviations contain.

[1] <Accumulation of Detection Signals Acquired at Two Edges of the Drive Pulse in Terms of Absolute Value Components>

The semiconductor device (101, 102) has a touch panel controller (3) connected to a touch panel (1) including a plurality of drive electrodes (Ym: Y1 to YM), a plurality of detection electrodes (Xn: X1 to XN), and capacitance components formed at intersections of the drive and detection electrodes. The touch panel controller has a plurality of drive terminals (PY1 to PYM) connected with the plurality of drive electrodes; a drive circuit (300) operable to output a drive pulse from the plurality of drive terminals; a plurality of detection terminals (PX1 to PXN) connected with the plurality of detection electrodes; a detection circuit (310) operable to create detection data by accumulating signals input through each detection terminal in synchronization with change in the drive pulse; and a control circuit (308) operable to control an action of detecting a touch and no touch by use of the drive circuit and the detection circuit. The detection circuit has a two-edge detection mode for creating detection data by accumulating, in terms of absolute value components, signals which are input through each detection terminal in synchronization with rising and falling changes of the drive pulse respectively and alternately change in polarity.

According to this embodiment, the signals can be accumulated an increased number of times even for the same length of time because of using the two-edge detection mode in comparison to a case where the detecting action is performed by use of only one of two edges of the drive pulse. Assuming the same number of accumulations, the time for the detection can be shortened. Hence, the invention contributes to the shortening of the time for touch detection by a touch panel, and the increase in the accuracy of touch detection.

[2] <Changeover Switch>

In the semiconductor device as described in [1], the detection circuit has: an integration circuit (301) operable to integrate a signal input through each detection terminal; and an analog-to-digital conversion circuit (304) operable to convert an analog signal resulting from the integration by the integration circuit into a digital signal to make the detection data. The integration circuit has an operational amplifier (AMPit); an integration capacitance (Cs); and a switching circuit (CFA1, CFA2, CFB1, CFB2) operable to switch the connection of the integration capacitance between an inverting input terminal of the operational amplifier and an output terminal thereof. The control circuit switches the connection of the switching circuit just before the change of the drive pulse.

According to this embodiment, a signal arising on each of the detection electrodes capacitively coupled to the drive electrodes at rising and falling edges of the drive pulse changes in the direction of increase and the direction of decrease. The operation of accumulating such a change as a signal component in terms of absolute value components can be readily materialized by simple means for switching the connection of the integration capacitance between an input of the integration circuit and an output thereof.

[3] <Initial Value of the Integration-Output Voltage>

In the semiconductor device as described in [2], an initial voltage of an output terminal of the integration circuit in the action of detecting a touch and no touch is a voltage close to a center value of an input range of the analog-to-digital conversion circuit.

According to this embodiment, the drive voltage to the detection electrodes can be roughly reduced to one-half the drive voltage in the case of the one-edge detection and as such, an electric field formed between a common electrode to which display cells of the display panel are connected, and the detection electrodes becomes smaller. For instance, in the case of a liquid crystal panel of IPS (Registered Trademark) type, the electric field becomes smaller in a direction of the thickness of the panel and therefore, it is useful to prevent the electric field from impairing the shutter function of the liquid crystal.

[4] <Integral Values in the Touched Condition and the No-Touch Condition in a Case where the Driving is Terminated at a Drive Pulse Falling Edge>

In the semiconductor device as described in [3], in a situation that the capacitance component of the intersection has been reduced by a touch, multiple-pulse driving is performed on the drive electrodes by a drive pulse, and the driving is terminated at a falling edge of the pulse, whereby a signal voltage obtained in the integration circuit is arranged to be equal to or lower than the upper limit of the input range of the analog-to-digital conversion circuit. In a situation that the capacitance component of the intersection has not been reduced because of no touch, multiple-pulse driving is performed on the drive electrodes by a drive pulse, and the driving is terminated at a falling edge of the pulse, whereby a signal voltage obtained in the integration circuit is made lower, in voltage, than a signal voltage in the touched condition.

According to this embodiment, the difference of the integration voltage value between the touched condition and the no-touch condition can be made roughly double the difference in the case of the one-edge detection mode.

[5] <Integral Values in the Touched Condition and the No-Touch Condition in a Case where the Driving is Terminated at a Drive Pulse Rising Edge>

In the semiconductor device as described in [3], in a situation that the capacitance component of the intersection has been reduced by a touch, multiple-pulse driving is performed on the drive electrodes by a drive pulse, and the driving is terminated at a rising edge of the pulse, whereby a signal voltage obtained in the integration circuit is arranged to be equal to or higher than a lower limit of the input range of the analog-to-digital conversion circuit. In a situation that the capacitance component of the intersection has not been reduced because of no touch, multiple-pulse driving is performed on the drive electrodes by a drive pulse, and the driving is terminated at a rising edge of the pulse, whereby a signal voltage obtained in the integration circuit is made higher, in voltage, than a signal voltage in the touched condition.

According to this embodiment, the difference of the integration voltage value between the touched condition and the no-touch condition can be made roughly double the difference in the case of the one-edge detection mode. Further, a larger integration signal value can be gained in comparison to an integration signal value obtained in the semiconductor device as described in [4].

[6] <Mode of Terminating the Driving at Drive Pulse Falling Edge, and Mode of Terminating the Driving at Drive Pulse Rising Edge>

The semiconductor device as described in [3], further includes: an instruction unit operable to provide an instruction on which of first and second driving-termination modes should be selected, wherein in the first driving-termination mode, driving by a drive pulse is terminated at a rising edge of the drive pulse, and in the second driving-termination mode, driving by a drive pulse is terminated at a falling edge of the drive pulse.

According to this embodiment, the scope of selection in the driving action can be enhanced.

[7] <Mode Register>

In the semiconductor device as described in [6], the instruction unit is a rewritable register provided in the control circuit.

According to this embodiment, the first driving-termination mode or the second driving-termination mode can be selected by means of a software program.

[8] <Display Panel Controller>

The semiconductor device as described in [3] further has: a display panel controller (4) operable to output a scan pulse and a gradation voltage signal to scan electrodes (G1 to G640) and signal electrodes (D1 to D1440) of a display panel (2) respectively; the display panel has a plurality of liquid crystal display cells (LCD) disposed at intersections of the scan and signal electrodes.

Supposing a usage form in which a display panel and a touch panel are used in combination, a semiconductor device equipped with a touch panel controller is improved in convenience according to this embodiment by this embodiment.

[9] <Time-Division Driving of the Touch Panel and Display Panel>

In the semiconductor device as described in [8], the control circuit controls the drive pulse in timing of change so that a point of changing time of the scan pulse and a point of changing time of the gradation voltage signal are included in a period between rising and falling edges of the drive pulse.

According to this embodiment, noise resistance of the action of detecting a touch and no touch can be increased without causing change in a scan pulse which drives the display panel, and a gradation voltage signal during the detecting action of the touch panel. Even if the time for detecting a touch and no touch is shortened by time-division driving, a required signal amount can be ensured because the detection is performed according to the two-edge detection mode. In the two-edge detection mode which can achieve double the number of detections in the one-edge detection mode, the semiconductor device retains a capacity enough to adapt to even further shortening of the time for detecting a touch and no touch according to the time-division method owing to the increase in resolution of a display panel. Therefore, the semiconductor device is suitable for use in combination with a high-resolution display panel.

[10] <Separation Switch Between Detection Circuit and Detection Electrode>

The semiconductor device as described in further has a separation switch (SW3) operable to separate the detection circuit from the detection terminal in every predetermined period including a point of changing time of the scan pulse and a point of changing time of the signal voltage.

According to this embodiment, even if the detection electrode receives noise from the display panel in a non-driving period of the drive electrode, or a non-detection period of the touch panel, the noise is prevented from being transmitted to the detection circuit. Thus, it becomes possible to suppress an undesired change of the integration signal in the course of integration owing to the noise.

[11] <Two-Edge Detection Mode and One-Edge Detection Mode>

In the semiconductor device as described in [1], the detection circuit further has a one-edge detection mode in which detection data is created by accumulating a signal input through the detection terminal more than one time in synchronization with any one of a rising change and a falling change of the drive pulse. The semiconductor device further includes: an instruction unit (320) operable to instruct which of the two-edge detection mode and the one-edge detection mode to select.

According to this embodiment, in the case of driving the touch panel and the display panel according to a time-division method, even if the display panel has a larger drive load, and the detection period of the touch panel is short, and thus a required integration signal amount cannot be ensured, the time required for the switching circuit can be assigned to the integrating action as long as the one-edge detection mode is selected. Therefore, the increase of an integration signal amount can be expected in some cases.

[12] <Mode Register>

In the semiconductor device as described in [11], the instruction unit is a rewritable mode register (320) provided in the control circuit.

According to this embodiment, the two-edge detection mode and the one-edge detection mode can be selected by means of a software program.

[13] <Action of Detecting a Touch and No Touch>

In the semiconductor device as described in [2], the action of detecting a touch and no touch controlled by the control circuit includes: (a) the step of initializing an inverting input terminal of the operational amplifier and its output terminal by use of a first voltage supplied, as a reference voltage, to a non-inverting input terminal of the operational amplifier; (b) the step of providing the drive electrode with a drive pulse with a predetermined pulse number; (c) the step of switching connection of the integration capacitance with the timing immediately before an edge change of the drive pulse; and (d) the step of converting, by the analog-to-digital conversion circuit, a signal subjected to integration by the integration capacitance in synchronization with each edge change of the drive pulse into a digital signal to create detection data.

According to this embodiment, the action of detecting a touch and no touch can be realized readily.

[14] <Accumulation of Detection Signals Acquired at Two Edges of the Drive Pulse [in Terms of Absolute Value Components>

The electronic device (100) includes: a touch panel (1) having a plurality of drive electrodes (Ym:Y1 to YM), a plurality of detection electrodes (Xn: X1 to XN), and a plurality of capacitance components formed at intersections of the drive and detection electrodes; a touch panel controller (3) connected with the touch panel; and a processor (5) connected with the touch panel controller. The touch panel controller has: a plurality of drive terminals (PY1 to PYM) connected with the plurality of drive electrodes; a drive circuit (300) operable to output a drive pulse from the plurality of drive terminals; a plurality of detection terminals (PX1 to PXN) connected with the plurality of detection electrodes; a detection circuit (310) operable to create detection data by accumulating signals input through each detection terminal in synchronization with change in the drive pulse; and a control circuit (308) operable to control the action of detecting a touch and no touch by use of the drive circuit and the detection circuit: The detection circuit has a two-edge detection mode for creating detection data by accumulating, in terms of absolute value components, signals which are input through each detection terminal in synchronization with rising and falling changes of the drive pulse respectively and alternately change in polarity. The processor calculates, based on the detection data, a coordinate point of a position on the touch panel where the touch panel is touched.

The electronic device according to this embodiment brings about the same effect and advantage as those of the semiconductor device as described in [1]

[15] <Changeover Switch>

In the electronic device as described in [14], the detection circuit has an integration circuit (301) operable to integrate a signal input through each detection terminal, and an analog-to-digital conversion circuit (304) operable to convert an analog signal resulting from the integration by the integration circuit into a digital signal to make the detection data. The integration circuit has an operational amplifier (AMPit), an integration capacitance (Cs), and switching circuit (CFA1, CFA2, CFB1, CFB2) operable to switch the connection of the integration capacitance between an inverting input terminal of the operational amplifier and an output terminal thereof. The control circuit switches the connection of the switching circuit just before the change of the drive pulse.

The electronic device according to this embodiment brings about the same effect and advantage as those of the semiconductor device as described in [2].

[16] <Initial Value of the Integration-Output Voltage>

In the electronic device as described in [15], an initial voltage of an output terminal of the integration circuit in the action of detecting a touch and no touch is a voltage close to a center value of an input range of the analog-to-digital conversion circuit.

The electronic device according to this embodiment brings about the same effect and advantage as those of the semiconductor device as described in [3].

[17] <Integral Values in the Touched Condition and the No-Touch Condition in a Case where the Driving is Terminated at a Drive Pulse Falling Edge>

In the electronic device as described in [16], in a situation that the capacitance component of the intersection has been reduced by a touch, multiple-pulse driving is performed on the drive electrodes by a drive pulse, and the driving is terminated at a falling edge of the pulse, whereby a signal voltage obtained in the integration circuit is arranged to be equal to or lower than an upper limit of the input range of the analog-to-digital conversion circuit. In a situation that the capacitance component of the intersection has not been reduced because of no touch, multiple-pulse driving is performed on the drive electrodes by a drive pulse, and the driving is terminated at a falling edge of the pulse, whereby a signal voltage obtained in the integration circuit is made lower, in voltage, than a signal voltage in the touched condition.

The electronic device according to this embodiment brings about the same effect and advantage as those of the semiconductor device as described in [4].

[18] <Integral Values in the Touched Condition and the No-Touch Condition in a Case where the Driving is Terminated at a Drive Pulse Rising Edge>

In the electronic device as described in [16], in a situation that the capacitance component of the intersection has been reduced by a touch, multiple-pulse driving is performed on the drive electrodes by a drive pulse, and the driving is terminated at a rising edge of the pulse, whereby a signal voltage obtained in the integration circuit is arranged to be equal to or higher than a lower limit of the input range of the analog-to-digital conversion circuit. In a situation that the capacitance component of the intersection has not been reduced because of no touch, multiple-pulse driving is performed on the drive electrodes by a drive pulse, and the driving is terminated at a rising edge of the pulse, whereby a signal voltage obtained in the integration circuit is made higher, in voltage, than a signal voltage in the touched condition.

The electronic device according to this embodiment has the same effect and advantage as those of the semiconductor device as described in [5].

[19] <Drive Pulse Falling-Edge-Driving-Termination Mode, and Drive Pulse Rising-Edge-Driving-Termination Mode>

The electronic device as described in [16] further includes: an instruction unit operable to provide an instruction on which of first and second driving-termination modes should be selected in the first driving-termination mode, driving by a drive pulse is terminated at a rising edge of the drive pulse, and in the second driving-termination mode, driving by a drive pulse is terminated at a falling edge of the drive pulse.

The electronic device according to this embodiment has the same effect and advantage as those of the semiconductor device as described in [6].

[20] <Mode Register>

In the electronic device as described in [17], the instruction unit is a register provided in the control circuit and rewritable for the processor.

The electronic device according to this embodiment has the same effect and advantage as those of the semiconductor device as described in [7].

[21] <Display Panel Controller>

The electronic device as described in [16] further includes: a display panel (2) having a plurality of liquid crystal display cells (LCD) disposed at intersections of the scan and signal electrodes; a display panel controller (4) operable to output a scan pulse and a signal voltage to scan electrodes (G1 to G640) and signal electrodes (D1 to D1440) of a display panel respectively. The touch panel is an in-cell touch panel built in the display panel.

The electronic device according to this embodiment brings about the same effect and advantage as those of the semiconductor device as described in [8].

[22] <Time-Division Driving of the Touch Panel and Display Panel>

In the electronic device as described in [21], the control circuit controls the drive pulse in timing of change so that a point of changing time of the scan pulse and a point of changing time of the signal voltage are included in a period between rising and falling edges of the drive pulse.

The electronic device according to this embodiment brings about the same effect and advantage as those of the semiconductor device as described in [9].

[23] <Switch for Separation Between the Detection Circuit and Detection Electrode>

The electronic device as described in [22] further includes: a separation switch (SW3) operable to separate the detection circuit from the detection terminal in every predetermined period including a point of changing time of the scan pulse and a point of changing time of the signal voltage.

The electronic device according to this embodiment brings about the same effect and advantage as those of the semiconductor device as described in [10].

[24] <Two-Edge Detection Mode and One-Edge Detection Mode>

In the electronic device as described in [14], the detection circuit further has a one-edge detection mode in which detection data is created by accumulating a signal input through the detection terminal more than one time in synchronization with any one of a rising change and a falling change of the drive pulse. The semiconductor device further includes: an instruction unit (320) operable to instruct which of the two-edge detection mode and the one-edge detection mode to select.

The electronic device according to this embodiment brings about the same effect and advantage as those of the semiconductor device as described in [11].

[25] <Mode Register>

In the electronic device as described in [24], the instruction unit is a mode register (320) provided in the control circuit, and rewritable for the processor.

The electronic device according to this embodiment brings about the same effect and advantage as those of the semiconductor device as described in [12].

[26] <Action of Detecting a Touch and No Touch>

In the electronic device as described in [15], the action of detecting a touch and no touch controlled by the control circuit includes (a) the step of initializing an inverting input terminal of the operational amplifier and its output terminal by use of a first voltage supplied, as a reference voltage, to a non-inverting input terminal of the operational amplifier; (b) the step of providing the drive electrode with a drive pulse with a predetermined pulse number; (c) the step of switching connection of the integration capacitance with the timing immediately before an edge change of the drive pulse; and (d) the step of converting, by the analog-to-digital conversion circuit, a signal subjected to integration by the integration capacitance in synchronization with each edge change of the drive pulse into a digital signal to create detection data.

The electronic device according to this embodiment brings about the same effect and advantage as those of the semiconductor device as described in [13].

2. Further Detailed Description of the Embodiments

The embodiments will be described further in detail.

<<Electronic Device Having a Two-Edge Detection Mode>>

FIG. 1 shows an example of the whole structure of a display-input device 100 according to the invention. The display-input device 100 shown in the drawing is an embodiment of the electronic device according to the invention. The display-input device constitutes a part of a portable terminal device, e.g. PDA or a mobile phone, and includes: a touch panel (TP) 1; a liquid crystal panel (DP) 2, which is an embodiment of a display panel; a touch panel controller (TPC) 3; a liquid crystal panel controller (DPC) 4 which is an embodiment of an display panel controller; a subprocessor (SMPU) 5; and a host processor (HMPU) 6. Forming the touch panel controller 3 and the liquid crystal panel controller 4 and if necessary, the subprocessor 5 in one semiconductor chip or mounting them on one package, semiconductor device 101, 102 can be materialized.

The touch panel 1 is a mutual capacitance type touch panel which enables a multi-touch detection. The touch panel 1 has a plurality of drive electrodes (Y-electrodes), a plurality of detection electrode (X-electrodes), and crossing parts formed by the drive and detection electrodes. The crossing parts each form a capacitance component. The touch panel controller 3 sequentially supplies the drive electrodes with a drive pulse, and acquires detection data corresponding to a variation in the capacitance component at each intersection based on signals thus obtained from the detection electrodes sequentially. The subprocessor (SMPU) 5 is a microprocessor for a subsystem, and controls the activation of the touch panel 1. The subprocessor performs a digital filtering calculation on detection data acquired by the touch panel controller 3 to remove noise therefrom. Based on the resultant data with noise removed therefrom, the subprocessor calculates position coordinates of the intersection with a variation of capacitance caused thereon. That is, the subprocessor calculates a position coordinate at the time of occurrence of an event of touch in order to indicate which intersection a stray capacitance has been changed on, namely which intersection a finger has approached or touched, or which intersection an event of touch has occurred on.

The touch panel 1 includes a transmissive (i.e. translucent) electrode and a dielectric film. The touch panel is superposed on the display face of the liquid crystal panel 2, for example. The forms of the combination of the touch panel 1 and the liquid crystal panel 2 are roughly classified into: an external attachment form in which the touch panel prepared as a discrete part is externally attached to the liquid crystal panel; and an in-cell form in which the touch panel is incorporated in the liquid crystal panel.

The host processor (HMPU) 6 creates display data. The liquid crystal panel controller 4 performs display control for displaying display data received from the host processor 6 on the liquid crystal panel 2. The host processor 6 acquires, from the subprocessor 5, position coordinate data at the time of occurrence of an event of touch, and analyzes an input resulting from the action on the touch panel 1 from the relation between position coordinate data in the liquid crystal panel controller and a frame of display image supplied to and displayed by the liquid crystal panel controller 4.

Although no special restriction is intended, a communication control unit, an image-processing unit, an audio-processing unit, and other units including an accelerator, which are not shown in the drawing, may be connected to the host processor 6 to form e.g. a portable terminal device.

Figure 2:
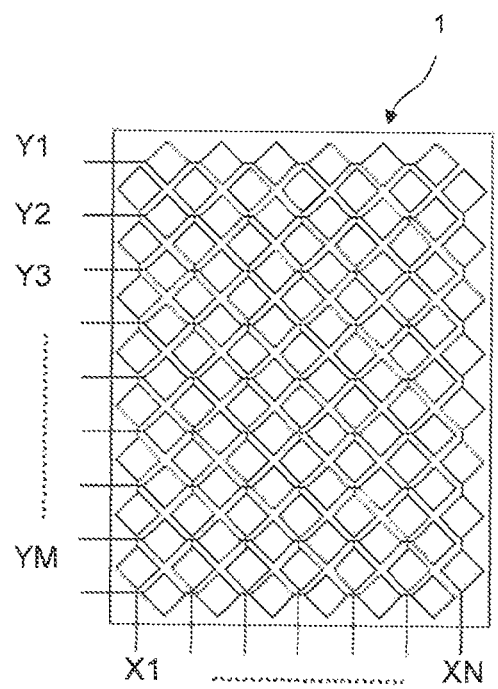
FIG. 2 is a plan view showing, by example, the electrode arrangement of a touch panel.

FIG. 2 shows, by example, the electrode arrangement of the touch panel 1. The touch panel 1 has a number of drive electrodes (namely Y-electrodes) Y1 to YM (also written as "Y-electrode Ym") formed in a horizontal direction, and a number of detection electrodes (namely X-electrodes) X1 to XN (also written as "X-electrode Xn") formed in a vertical direction; the drive and detection electrodes are electrically insulated from each other. Each electrode has e.g. a square-shaped part interposed at even intervals along its extending direction, and the square-shaped part forms a capacitance electrode. At each intersection of the X-electrodes and Y-electrodes, a node capacitance is formed through the capacitance electrodes of the respective electrodes. If an object such as a finger approaches the node capacitance, the object makes a capacitance electrode to form a stray capacitance, which is added to the node capacitance. On application of a drive pulse from the touch panel controller 3, the Y-electrodes Y1 to YM are driven e.g. in the order in which they are arranged.

Figure 3:
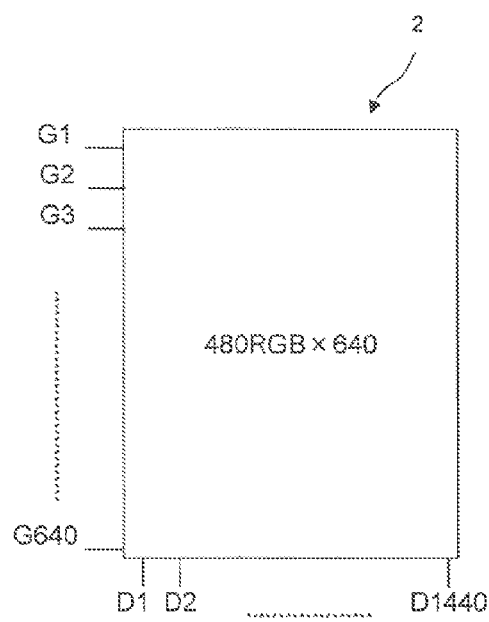
FIG. 3 is a plan view showing, by example, the electrode arrangement of a liquid crystal panel.

FIG. 3 shows, by example, the electrode arrangement of the liquid crystal panel 2. The display size of the liquid crystal panel 2 shown in the drawing is as large as 480 RGB×640, for example. The liquid crystal panel 2 has gate electrodes G1 to G640 formed to horizontally extend, and serving as scan electrodes; drain electrodes D1 to D1440 formed to vertically extend, and serving as signal electrodes; and a number of liquid crystal display cells arranged at intersections of the gate and drain electrodes, and each having a select terminal connected to the corresponding scan electrode and an input terminal connected to the corresponding signal electrode. On application of a scan pulse from the liquid crystal panel controller 4, the gate electrodes G1 to G640 are driven (or subjected to scan activation) e.g. in the order in which they are arranged. The drain electrodes D1-D1440 are supplied gradation data of a scanning-drive line in synchronization with the scan activation of the gate electrodes.

Figure 4:
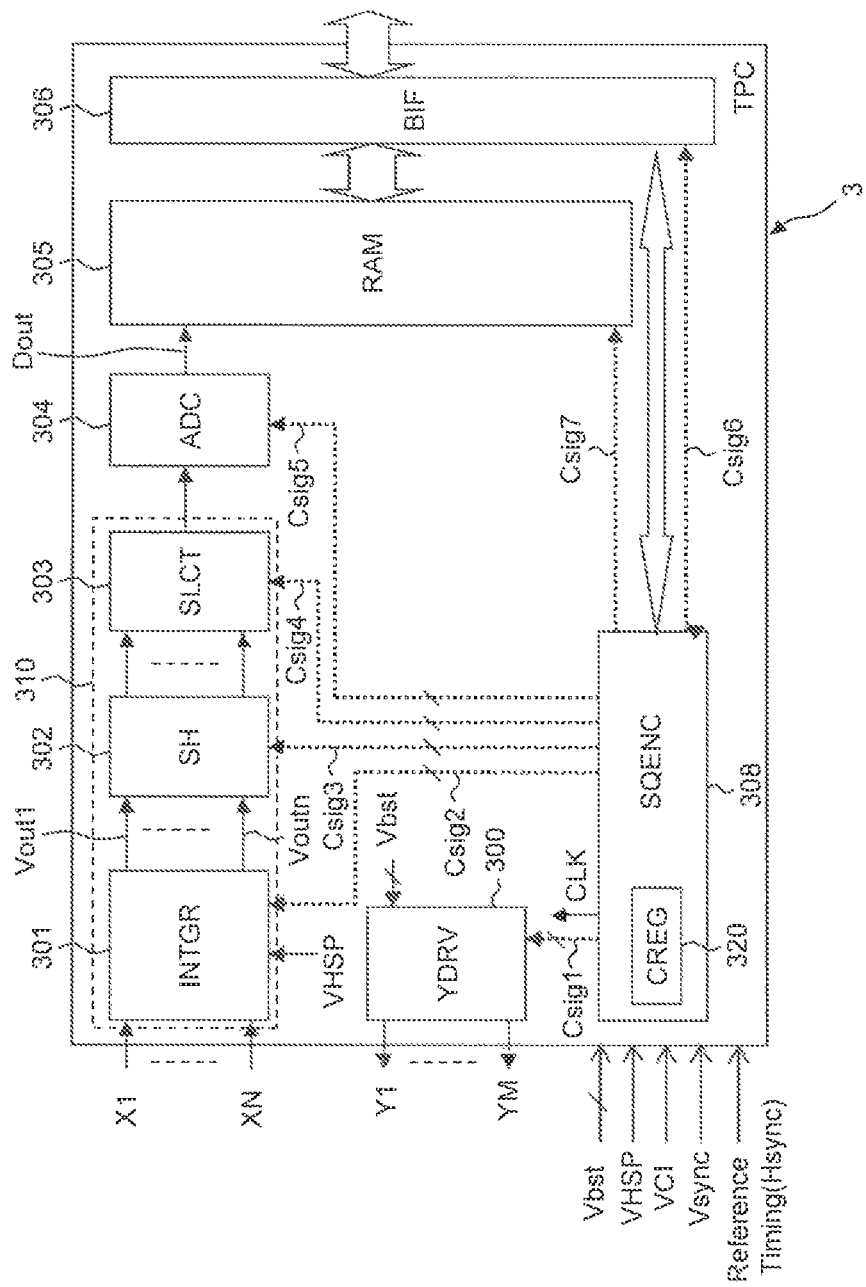
FIG. 4 is a block diagram showing, by example, the whole structure of a touch panel controller.

FIG. 4 shows, by example, the whole structure of the touch panel controller 3. The touch panel controller 3 has: a drive circuit (YDRV) 300; a detection circuit (XDTC) 310; an analog-to-digital conversion circuit (ADC) 304; a RAM 305; a bus interface circuit (BIF) 306; and a sequence-control circuit (SQENC) 308 serving as a control circuit. The detection circuit 310 includes: an integration circuit (INTGR) 301; a sample hold circuit (SH) 302; and a selector (SLOT) 303, for example. A circuit for calibration for the detection circuit 310 is shown in the drawing. The analog-to-digital conversion circuit is also written as "AD conversion circuit" simply.

The drive circuit 300 repeats the action of sequentially outputting a drive pulse to the Y-electrodes Y1 to YM for detection of a touch with a predetermined timing. The drive pulse supplied to each Y-electrode is controlled to more than one fixed pulse. At the rising edge of the drive pulse, an electric charge is discharged to the X-electrode Xn capacitively coupling with the Y-electrode Ym. In contrast, an electric charge is absorbed from the X-electrode Xn capacitively coupling with the Y-electrode Ym at the falling edge of the drive pulse.

The charge transfer as described above is caused on the X-electrodes X1 to XN in synchronization with the drive pulse, and the integration circuit 301 integrates the transferred charges in synchronization With the rising and edges of the drive pulse. The detection at the two edges is to be described later. The sample hold circuit 302 holds signals resulting from the integration by detection electrodes as detection signals. The detection signals thus held are converted into detection data by the AD conversion circuit 304 after having selected by the selector 303. The resultant detection data are accumulated in RAM 305. The detection data accumulated in RAM 305 are supplied to the subprocessor 5 through the bus interface circuit 306, and then used in the digital filtering calculation and the coordinate calculation.

The sequence-control circuit 308 uses control signals Csig1 to Csig6 to control the actions of the drive circuit 300, the integration circuit 301, the sample hold circuit 302, the selector 303, the AD conversion circuit 304 and the bus interface circuit 306, and further uses a control signal Csig7 to control access to RAM 305. Although no special restriction is intended, a pulse voltage Vbst of the drive pulse which the drive circuit 300 outputs to the Y-electrodes, an initialization voltage (precharge voltage) VHSP of the X-electrodes input by the integration circuit 301, and a source voltage VCI are supplied from outside the touch panel controller 3.

The sequence-control circuit 308 accepts the input of a vertical synchronizing signal Vsync of the liquid crystal panel 2 and a reference-timing signal Tref for use in driving the touch panel 1 and the liquid crystal panel 2 according to a time division method. The reference-timing signal Tref is a timing signal used to create a drive timing of the drive electrode Ym. For instance, a horizontal synchronizing signal Hsync of the liquid crystal panel 2 may be used as the reference-timing signal Tref. This embodiment is described on the assumption that the reference-timing signal Tref is the horizontal synchronizing signal Hsync.

Figure 5:
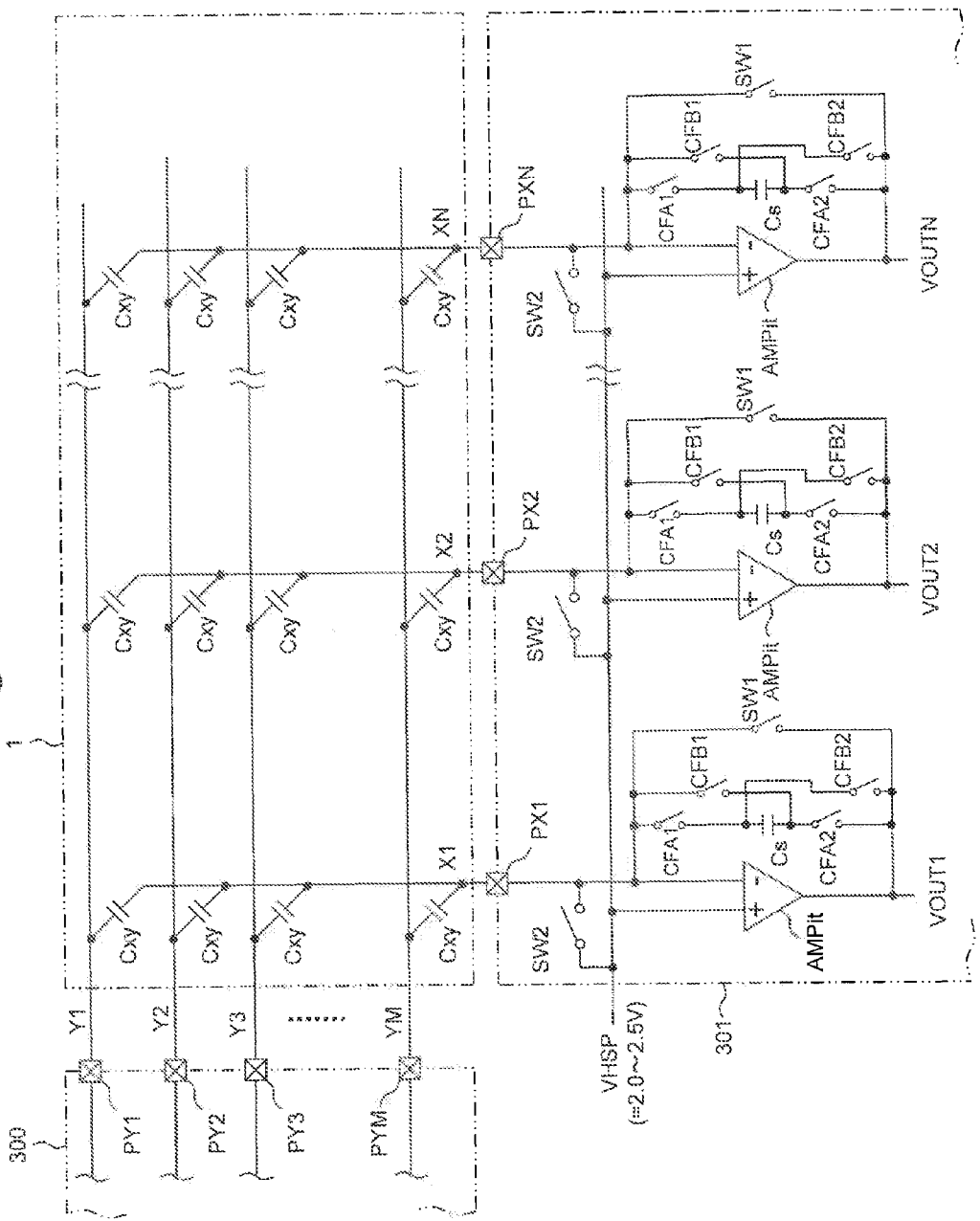
FIG. 5 is a circuit diagram showing, by example, the equivalent circuits of the touch panel and an integration circuit.

FIG. 5 shows, by example, the equivalent circuits of the touch panel 1 and the integration circuit 301. In the touch panel 1, the Y-electrodes Y1 to YM, and the X-electrodes X1 to XN are arranged so as to form a matrix; a node capacitance (mutual capacitance) Cxy is formed at each of intersection thereof.

The integration circuit 301 includes: a switch SW2 for supplying the X-electrodes X1 to XN with the precharge voltage VHSP charging the X-electrodes X1 to XN; an operational amplifier AMPit having a non-inverting input terminal(+) supplied with the precharge voltage VHPS and an inverting input terminal(−) connected with the corresponding X-electrode Xn; an integration capacitance Cs; a switch SW1 for resetting the integration capacitance Cs; and a switching circuit for switching the connection of the integration capacitance Cs between an output terminal thereof and the inverting in terminal(−) of the operational amplifier AMPit.

The switching circuit includes a switch CFA1 for connecting one capacitance electrode of the integration capacitance Cs to the inverting input terminal(−) of the operational amplifier AMPit; a switch CFA2 for connecting the other capacitance electrode to the output terminal of the operational amplifier AMPit; a switch CFB1 for connecting the other capacitance electrode of the integration capacitance Cs to the inverting input terminal(−) of the operational amplifier AMPit; and a switch CFB2 for connecting the one capacitance electrode to the output terminal of the operational amplifier AMPit, for example. A combination of the switches CFA1, CFA2, and a combination of the switches CFB1, CFB2 are controlled complementarily in switching. The switch SW1 is a switch which resets an accumulated charge by the short circuit between the two capacitance electrodes of the integration capacitance. The drive terminals PY1 to PYM are drive terminals of the drive circuit 300 connected with the drive electrodes Y1 to YM. The detection terminals PX1-PXN are detection terminals of the integration circuit 301 connected with the detection electrodes X1 to XN.

The precharge voltage (initialization voltage) VHSP of the X-electrode Xn (n is 1 to N, and N is the number of the X-electrodes) is approximately 2.0 to 2.5 V, the detail of which is to be described later. The precharge voltage VHSP is a reference voltage for the action of touch detection. To realize the two-edge detection mode, it is only necessary to roughly set the precharge voltage to about one-half of the source voltage, namely 2.0 to 2.5 V. This is because the voltage transition of the output voltage VOUTn of the operational, amplifier AMPit is caused bidirectionally with respect to the precharge voltage VHSP. Incidentally, in a conventional one-edge detection mode, namely the method of performing the detection only at the rising edge of a drive pulse to a Y-electrode, the precharge voltage VHSP is set to a voltage of about 4 V which is near the source voltage AVDD (=5 V). The reason for making the setting like this is that the voltage transition of the output voltage of the operational amplifier of the detection circuit is caused only in one direction.

Figure 6:
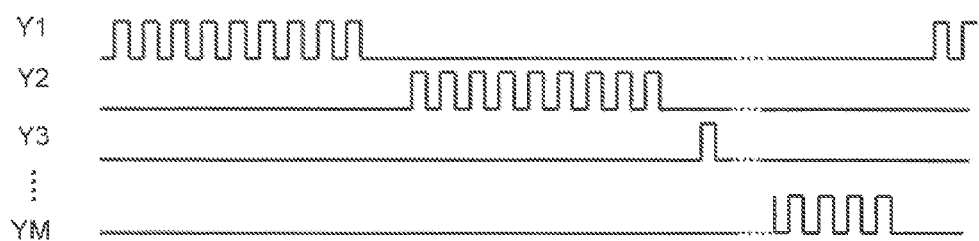
FIG. 6 is a waveform diagram showing, by example, the signal waveform of a drive pulse signal supplied to Y-electrodes Y1 to YM.

FIG. 6 shows, by example, the signal waveform of a drive pulse signal supplied to the Y-electrodes Y1 to YM. For instance, the Y-electrodes Y1 to YM are supplied with a predetermined pulse number of drive pulses in the order of the arrangement of the electrodes. In the embodiment shown in the drawing, a drive pulse including nine pulses is supplied to the Y-electrodes in the order of the Y-electrodes Y1 to YM so that the drive pulses provided to the Y-electrodes never overlap one another for the sake of convenience.

FIG. 7 shows, by example, the timing of the detecting action on the Y-electrode Ym (m is 1 to M) according to the two-edge detection mode. The embodiment shown in the drawing is based on the assumption that the touch detection is performed on the Y-electrodes in synchronization with the vertical synchronizing signal Vsync of the liquid crystal panel 2, which starts with the Y-electrode Y1, and terminates with the last Y-electrode YM before the subsequent falling edge of the vertical synchronizing signal Vsync comes. Especially, in this embodiment, it is not taken into account to drive the liquid crystal panel 2 and the touch panel 1 according to the time division method, for easy understanding.

In the embodiment shown in FIG. 7, CFA1/2 represents the switches CFA1, CFA2, and CFB1/2 represents the switches CFB1, CFB2. The voltage of a voltage waveform on the X-electrode Xn, and the initial voltage of a voltage waveform on the output terminal VOUTn of the operational amplifier AMPit are VHSP. The switches SW1, SW2, CFA1/2, and CFB1/2 are controlled in synchronization with an action-reference clock clk, and their control signals are produced by the sequence-control circuit 308. The high-level and low-level widths of a drive pulse supplied to the Y-electrode Ym, and the cycle thereof can be changed by the settings on the control register 320 of the sequence-control circuit 308.

The period "a" is a reset period of the integration capacitance Cs and also, a precharge period of the precharge voltage VHSP of the X-electrode Xn. The period "ba" is a detection period when performing the detection by use of the rising edge of the drive pulse provided to the Y-electrode Ym. The period "bb" is a detection period when performing the detection by use of the falling edge of the drive pulse provided to the Y-electrode Ym.

First, in the period "a", the switch SW2 is turned ON first, and a predetermined level of voltage VHSP is applied to an input of the integration circuit 301, and the X-electrodes X1 to XN of the touch sensor 2 to bring the integration circuit into a reset state. After that, the switch SW2 is turned OFF; the integration circuit 301 is set in a state of waiting for a touch signal; the switches CFA1, CFA2 are set in ON state; and the switches CFB1, CFB2 are set in OFF state. In this state of waiting for detection, the X-electrode Xn remains disconnected to the precharge voltage VHSP, but the voltage level of the inverting input terminal(−) of the integration circuit 301 arranged to be virtually grounded is maintained as it is.

After the transition to the state of waiting for detection, a rising pulse having an amplitude Vy is input to the Y-electrode Y1 as the drive pulse (with other Y-electrodes Y2 to YM fixed at the low level). As a result, an electric charge (=Vy×Cxy) is moved to the X-electrode Xn (X1 to XN) through a node capacitance Cxy on the Y-electrode Y1, and the output voltage VOUTn of the operational amplifier AMPit which has received the electric charge through the inverting input terminal(−) transitions towards a lower voltage by a voltage corresponding to the charge thus moved. If a finger is present near a certain node capacitance Cxy, the combined capacitance value of the node capacitance Cxy is reduced owing to a stray capacitance produced by the finger. For instance, if the capacitance value of the node capacitance Cxy is reduced by a capacitance value Cf at the intersection of the X-electrode X2 and the Y-electrode Y1, a charge to be input to the operational amplifier AMPit of the X-electrode X2 is Vy×(Cxy−Cf), and a reduction in the level of the output VOUT2 of the operational amplifier AMPit is smaller than that when no finger is present on or near the intersection.

Now, supposing that the drive pulse of the drive electrode Y1 is made to fall with the switches CFA1, CFA2 left in ON state, and the switches CFB1, CFB2 left in OFF state, the following effect is expected: the electric charge accumulated by the integration capacitance Cs at the rise of the drive pulse moves towards the detection electrode Xm of the touch sensor, the output VOUTn of the operational amplifier AMPit transitions to the initial voltage VHSP, and thus the integration circuit is turned back to the condition of the period "a". In a situation like this, the action of touch detection cannot be performed.

Hence, before falling the drive pulse Y1, the switches CFA1, CFA2 are inverted into OFF state, and the switches CFB1, CFB2 are inverted into ON state. In this way, the output VOUTn of the operational amplifier AMPit is switched, in voltage level, to be line-symmetrical about the initial voltage VHSP. After that, the electric charge is released from the integration capacitance Cs by causing the drive pulse Y1 to fall, and thus the output VOUTn of the operational amplifier AMPit transitions towards a higher voltage. Consequently, the direction of voltage transition of the output voltage VOUTn with respect to the initial voltage VHSP coincides with the direction of electric potential buildup at the time of rise of the drive pulse applied to the drive electrode Y1, and the time of fall of the drive pulse. In other words, the output voltage VOUTn transitions in the direction of the increase in the potential difference from the initial voltage VHSP at the time of rise of the drive pulse and the time of fall of the drive pulse. Thus, results of the detection according to more than one pulse change of the drive pulse can be accumulated.

With the aid of the complementary switching control of the switches CFA1, CFA2 and the switches CFB1, CFB2, two detecting actions can be performed with one drive pulse Therefore, it becomes possible to acquire twice the amount of touch signals for the same detection time in comparison to the one-edge detection in which the detecting action is performed at one edge of the drive pulse, and the detection time for taking the same amount of touch signals can be reduced by one-half.

As shown in FIG. 7, the output voltage VOUTn provided by the operational amplifier AMPit in the detecting action will be caused to upward and downward swing with respect to the precharge voltage VHSP in voltage level. Now, it is noted that in the case of using, as a power source of the detection circuit 310, e.g. a source voltage AVDD (5.0V) on the positive side and a source voltage GND (0V) on the negative side, the precharge voltage VHSP must be set so that the output voltage VOUTn reaches neither the source voltage AVDD nor GND in the detection period. In other words, the two-edge detection method requires that the precharge voltage VHSP should be set to a voltage of 2.0 to 2.5 V, which is roughly about the middle between the source voltages AVDD and GND.

In addition, the subprocessor 5 uses detection data, which results from the conversion of the output voltage VOUTn of the operational amplifier AMPit into a digital value by the AD conversion circuit 304, to calculate a coordinate of a touch region of the touch panel 1. Therefore, it is desired that the output voltage VOUTn falls in an input range of the AD conversion circuit 304. In other words, it is desired that the output voltage VOUT it is smaller than a high-potential side reference voltage VADCREFH of the AD conversion circuit 304, and larger than a low-potential side reference voltage VADCREFL in voltage level. To realize such a situation, it is required that the precharge voltage VHSP be roughly about 2.0 to 2.5 V as described above in the case of e.g. VADCREFH=5V and VADCREFL=0V, for example.

Further, in an in-cell type touch sensor, X-electrodes and Y-electrodes of a touch sensor 1 are built in one panel together with components of a liquid crystal panel 2, e.g. gradation-control electrodes, a common electrode (COM) and a color filter. Taking into account the capacitive coupling between electrodes of the touch sensor 1 and the liquid crystal panel 2, it is desired that especially the voltage VHSP to be applied to the X-electrodes is a low voltage. Specifically, if there is a problem in connection with a breakdown voltage between electrodes of a liquid crystal panel, or the mutual capacitance Cxy between the X-electrode Xn on which the detection is performed, and the Y-electrode Ym has a dependence on the gradation-control voltage of the liquid crystal panel 2, it is desired to lower the voltage VHSP for the purpose of reducing the influence thereof.

FIG. 8 shows, by example, a transition waveform of the output voltage VOUTn of the integration circuit 301 together with the drive pulse in the case of having performed the detecting action according to the two-edge detection mode.

The upper row portion from the top of the drawing shows a transition waveform of the output voltage VOUTn with a small touch signal. The lower row portion of the drawing shows transition waveform of the output voltage VOUTn with a large touch signal. In the drawing, a solid line represents a transition waveform of the output voltage VOUTn in the no-touch condition, and a thin line represents a transition waveform of the output voltage with a touching action performed.

In the embodiment of FIG. 8, the reference voltages VADCREFH and VADCREFL used in the AD conversion circuit 304 meet the following conditions: VADCREFH=4V; and VADCREFL=GND. In this case, about one-half of the input range of the AD conversion circuit 304 is a rough standard, and the precharge voltage VHSP is set to be 2.0 V. Further, making correction so that the output voltage VOUTn of the integration circuit 301 is about 0.5 to 1.0 V in the no-touch condition on condition that the drive pulse is changed in pulse a predetermined number of times, which is more than once, the output voltage VOUTn in the touched condition can be caused to transition towards the higher potential side according to the strength of the touch, and the contact area of a touched portion.

It is desired to set the sensitivity of the detection circuit so that the output voltage VOUTn never exceeds the high-potential side reference voltage VADCREFH even when a touch signal is quantitatively maximum. It is desired that the output voltage VOUTn is 30 to 3.5 V even when a signal in the touched condition is large as shown by the waveform in the lower row portion of FIG. 8, for example To adjust the sensitivity as described above, it is only necessary to adjust the capacitance value of the integration capacitance Cs in the embodiment shown by FIG. 5. The adjustment can be executed easily as long as the capacitance value of the integration capacitance Cs can be switched by select data written into the control register CREG.

For the sake of simplicity, in FIG. 8, the pulse number of the drive pulse Ym used for one detection is four, and the detecting action is performed four times in line with a rising edge and three times in line with a falling edge. The reason why the detecting action is not performed at the fourth falling edge of the drive pulse is to set the output voltage VOUTn when no touch is taking place on a low-voltage side, and to set the output voltage VOUTn when a touch is taking place on a high-voltage side. In addition, this brings about the effect that the relation between the output voltage in the no-touch condition, and the output voltage in the touched condition is the same as that in the one-edge detection mode to be described later. Incidentally, even if the detecting action is terminated at the falling edge of the fourth pulse of the drive pulse, the output voltage VOUTn in the no-touch condition, and the output voltage VOUTn in the touched condition are just set on the high-voltage side, and the low-voltage side, respectively. Adding a simple calculation before a coordinate computation to be executed after having acquired frame data (detection data of one frame of the touch panel 2) in the touched condition, it is possible to adapt to such modification. The detail of the calculation is concretely as follows. If touch detection data DOUTn after AD conversion consists of e.g. 10 bits, the calculation is performed according to the following equation: DOUTn=1023−DOUTn.

In the case of the detecting action terminated at a rising edge of the pulse, the number of integrations can be set to be larger than that in the case of the detecting action terminated at a falling edge of the pulse by one. As a result, a touch signal component can be made larger, but the relation of electric potential between the touched condition and the no-touch condition is different from that in the one-edge detection mode. Taking the above into account, the conditions of terminating the detecting action may be selected. Specifically, the conditions are: to terminate the detecting action at a falling edge of the pulse; and to terminate the detecting action at a rising edge of the pulse. The conditions of terminating the detecting action can be changed by timing adjustment of voltage transmission to the sample hold circuit which is regulated by the sequence-control circuit 308. For instance, the change can be made by making reference to a mode bit TPC_ENDEDGE held in the control register 320 of the sequence-control circuit to create a control signal Csig3. The mode bit TPC_ENDEDGE can be overwritten by e.g. the subprocessor 5. In a case where the setting of terminating the detecting action has been made at a falling edge of the drive pulse according to the mode bit TPC_ENDEDGE, the voltage relation between the touched condition and the no-touch condition is as described in the item a) below. In a case where the setting of terminating the detecting action has been made at a rising edge of the drive pulse, the voltage relation between the touched condition and the no-touch condition is as described in the item b) below.

a) Integration voltage in the no-touch condition<Integration voltage in the touched condition≤Upper limit voltage of the input range of ADC304.

b) Lower limit voltage of the input range of ADC304≤Integration voltage in the touched condition<Integration voltage in the no-touch condition.

While in FIG. 8, the pulse number of the drive pulse Ym is four, the pulse number of the drive pulse Ym used in one detecting action is actually e.g. 32. In this case, an action of the integration is performed 63 times in total when creating detection data by accumulating, in terms of absolute value components, signals which are input through each detection terminal in synchronization with 32 rising changes of the drive pulse Ym and 31 falling changes thereof and alternately change in polarity. In this process, to ensure ΔV=1.0 V as the potential difference ΔV in the output voltage VOUTn between the touched condition and the no-touch condition, the change in voltage required for one detecting action is 15-9 mV (=1.0 V/63 times) even with a small touch signal. In contrast, in a case where the detecting action performed 32 times in conventional one-edge detection, the change in voltage required for one detecting action is 31.3 mV (=1.0 V/32 times). In conclusion, it is obvious that the two-edge detection mode is more advantageous in acquiring a small touch signal in comparison to the one-edge detection mode even if the number of pulses of the drive pulse is unchanged therebetween. This means that the accuracy of touch detection is increased even with the same touch-detection time.

Figure 9:
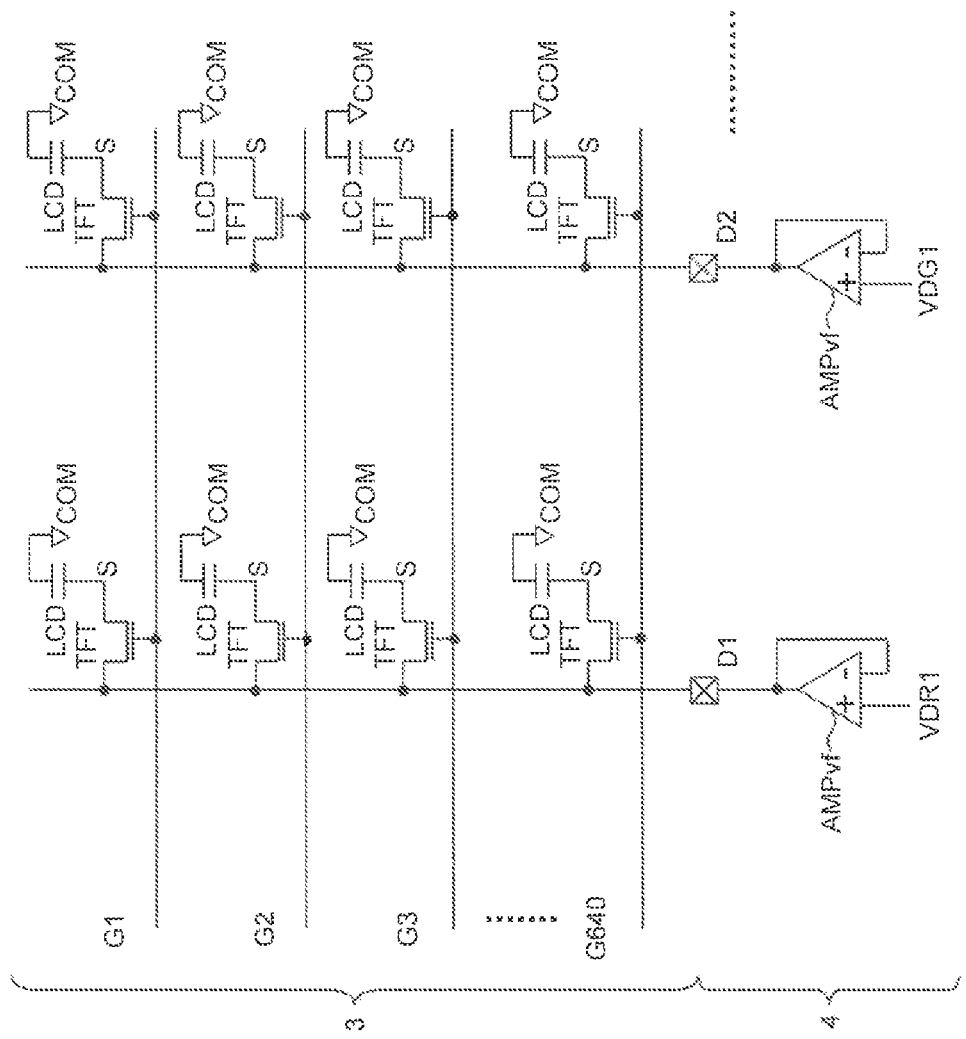
FIG. 9 is a circuit diagram showing, by example, the equivalent circuit of the liquid crystal panel.
Figure 10:
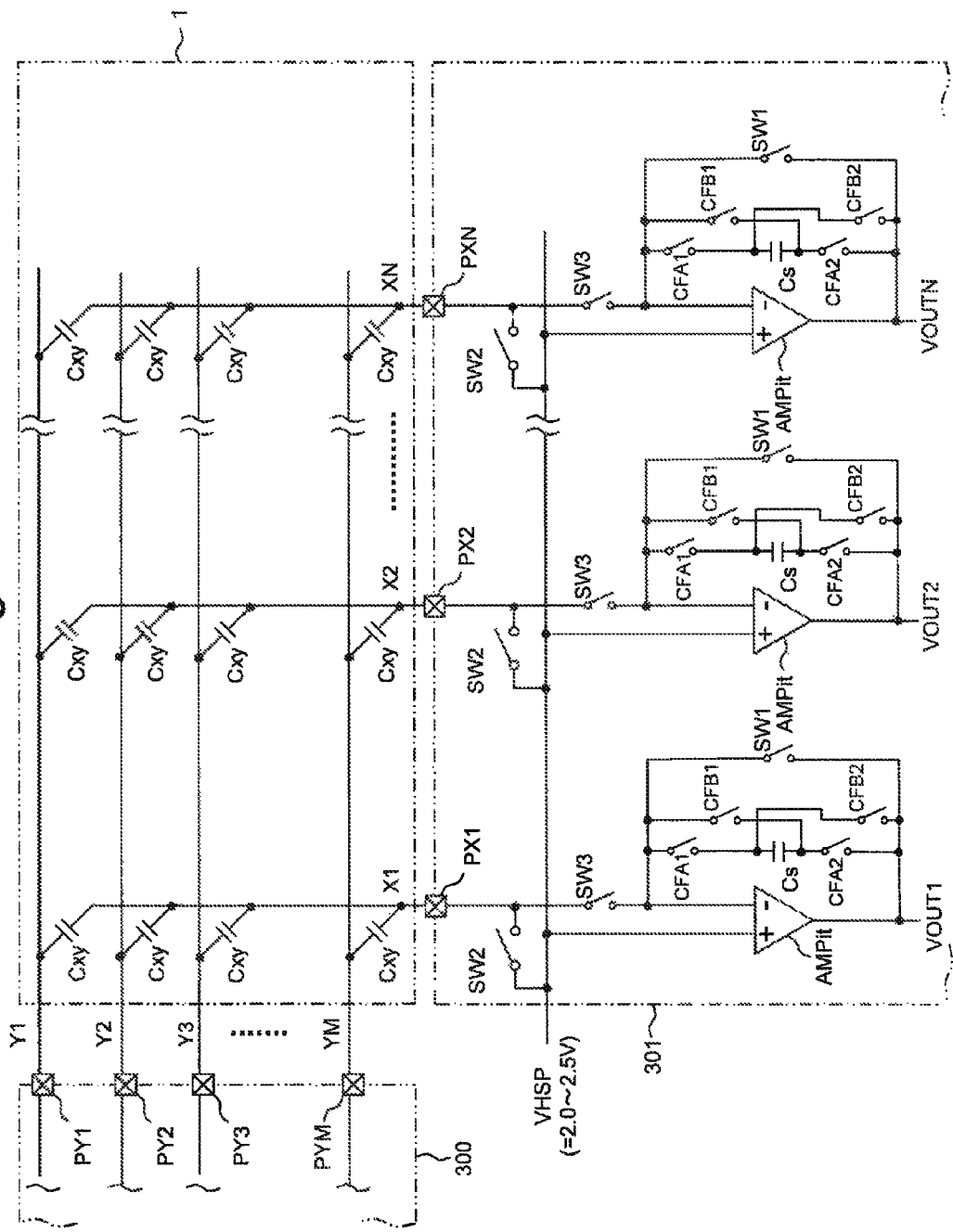
FIG. 10 is a circuit diagram showing, by example, the equivalent circuits of the touch panel and an integration circuit which is necessary for adopting both the time-division driving of the liquid crystal panel and the touch panel, and the two-edge detection method.

FIG. 9 shows, by example, the equivalent circuit of the liquid crystal panel 2. The liquid crystal panel 2 has a plurality of gate electrodes G1 to G640, and a plurality of drain electrodes D1 to D1440, which are arranged so as to form a matrix, and a plurality of TFT switches formed at intersections of the gate and drain electrodes respectively. Incidentally, TFT stands for "Thin Film Transistor". Each TFT switch is connected, on its source side, with a liquid crystal pixel electrode S of the liquid crystal capacitance LCD, forming a sub-pixel, and the opposite-side electrode of the liquid crystal capacitance LCD is formed by a common electrode (COM). An output of a voltage follower formed by each operational amplifier AMPvf of the liquid crystal panel controller 4 is coupled to corresponding one of the drain electrodes D1 to D1440. The voltage follower outputs a signal voltage. For instance, the operational amplifier AMPvf connected with the drain electrode D1 is supplied with a gradation voltage VDR1 corresponding to a red color, and the operational amplifier AMPvf connected with the drain electrode D2 is supplied with a gradation voltage VDG1 corresponding to a green color. The gate electrodes G1 to G640 are supplied with a scan pulse e.g. in the order of the arrangement of the electrodes FIG. 10 shows, by example, the equivalent circuits of the touch panel 1 and the integration circuit 301A which is necessary for adopting both the time-division driving of the liquid crystal panel 2 and the touch panel 1, and the two-edge detection method. The circuit arrangement of FIG. 10 is different from that of FIG. 5 in that a separation switch SW3 is added. The separation switch SW3 serves to separate the inverting input terminal(−) of the operational amplifier AMPit from the detection terminal PXn for each predetermined period within which the times when a scan pulse and a gradation voltage signal for driving the liquid crystal panel 2 change fall. In FIG. 10, like circuit components are identified by the same reference characters as used in FIG. 5, and the detailed description thereof will be skipped here.

Figure 11:
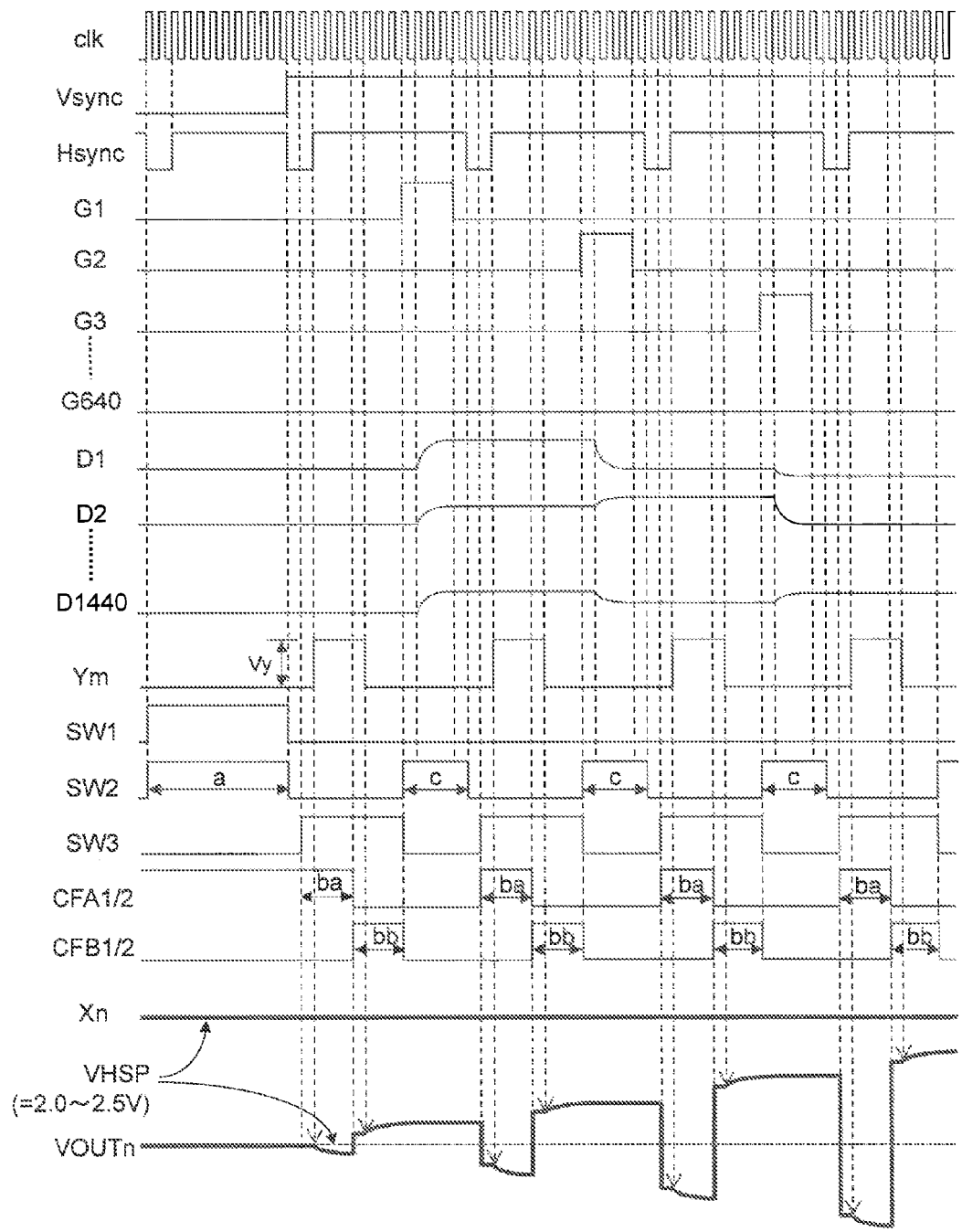
FIG. 11 is a timing diagram showing, by example, the action timing when the time-division driving of the liquid crystal panel and the touch panel, and the two-edge detection method are both adopted.

FIG. 11 shows, by example, action timings in a case where the time-division driving of the liquid crystal panel 2 and the touch panel 1, and the two-edge detection method are both adopted. In FIG. 11, G1 to G640 each represent a gate electrode and also, a gate pulse supplied to the gate electrode for the sake of convenience. Likewise, D1 to D1440 each represent a drain electrode and also, a gradation voltage signal supplied to the drain electrode. This embodiment is arranged so that detection data are acquired in synchronization with the vertical synchronizing signal Vsync in units of a display frame in detection of a touch, and especially the action of touch detection is performed in synchronization with the horizontal synchronizing signal Hsync. The basic action of detecting a touch per se is the same as that described with reference to FIG. 7.

The period "a" is a reset period of the integration capacitance Cs in the detection circuit, and a precharge period of the detection electrode Xn by the precharge voltage VHSP. The period "ba" is a detection period in the case that a rising edge of a drive pulse to the detection electrode Xn is used. The period "bb" is a detection period in the case that a falling edge of a drive pulse to the detection electrode Xn is used. The switching to the period "ba" is performed just before the rising edge of the drive pulse Ym, and the switching to the period "bb" is performed just before the falling edge of the drive pulse Ym. The period "c" is a precharge period of the detection electrode Xn by the precharge voltage VHSP. In the period "c", the action of touch detection is not performed, and the gradation control of the liquid crystal panel 2 is performed. Specifically, in the period "c", a corresponding gradation voltage is applied to each of the drain electrodes D1 to D1440 of the liquid crystal panel 2, and a gate pulse is applied to gate electrodes G1 to G640 of the liquid crystal panel 2 in the order of lines sequentially.

The period for touch detection is a sum total of the period "ba" and the period "bb", during which the switch SW3 remains ON. In the period "c" during which the gradation control of the liquid crystal panel 2 is performed, the switch SW3 is in OFF state, whereby the connection between the touch panel 1 and the detection circuit 310 is cut off. As a result, noise at the time of gradation control of the liquid crystal panel 2 is never transmitted to the detection circuit 310. As a result, noise resistance against noise especially owing to display driving of the liquid crystal panel 2 can be enhanced. In the period "c" during which gradation control of the liquid crystal panel 2 is performed, the detection electrode Xn cut off from the integration circuit 301 by the switch SW3 is precharged to the precharge voltage VHSP through the switch SW2. If the precharge is not performed, the detection electrode Xn cut off from the integration circuit 301 by the switch SW3 goes into a floating state, the voltage of the detection electrode Xn would fluctuate from the precharge voltage VHSP under the influence of gradation control of the liquid crystal panel 2. If the switch SW3 is inverted and put in ON state to start the detection period "ba" with undesired voltage fluctuation arising on the detection electrode Xn, (a) an amount of charge representing the voltage fluctuation is input to the integration circuit 301 first, and then (b) a charge from the drive electrode Ym is input to the detection electrode Xn after the passing of one clock of the reference clock clk because the inverting input terminal(−) of the operational amplifier AMPit of the integration circuit, and the non-inverting input terminal(+) are different from each other in potential. Since the electric charge is input to the integration circuit 301 as described in the above (a), the output voltage VOUTn would fluctuate from an expected value. In the period "c" during which the gradation control is performed, the fluctuation on the detection electrode Xn attributed to the influence of the gradation control of the liquid crystal panel 2 is absorbed by a source-side circuit of the precharge voltage VHSP through the switch SW2 as long as the detection electrode Xn cut off from the integration circuit 301 by the switch SW3 is precharged to the precharge voltage VHSP through the switch SW2. In addition, as long as the detection electrode Xn is made the precharge voltage VHSP in the period "c", at the start of the period "ba" the inverting input terminal(−) and non-inverting input terminal(+) of the integration amplifier AMPit are coincident with each other in potential (precharge voltage VHSP), the charge as described in the above (a) is not input, and it becomes possible to detect only a desired charge of (b) from the drive electrode Ym.

In addition, as described with reference to FIG. 7, one drive pulse allows two executions of the detecting action because of the switching control of the connection of the integration capacitance Cs by complementary switching actions of the switches CFA1, CFA2 and switches CFB1, CFB2. Therefore, double the amount of touch signals in the case of the one-edge detection can be obtained for the same detection time.

The time ratio of a touch-detection period (i.e. a sum total of the period "ba" and the period "bb") to the period "c" which is a gradation control period of the liquid crystal panel 2 is optimized according to the load condition of the liquid crystal panel 2, and the load condition of the touch panel 1, and what is illustrated in FIG. 11 is just one example FIG. 12 shows, by example, a truth table used when switching, by means of a register, between the two-edge detection mode (Dual according to the two-edge detection method, and one-edge detection mode (SingleEdge) according to the one-edge detection method. The two-edge detection mode (DualEdge) is specified by TPC_EGMODE=1, and the one-edge detection mode (SingleEdge) is specified by TPC_EGMODE=0. The mode bit TPC_EGMODE is included in a predetermined bit of the control register 320. The sequence-control circuit 308 makes reference to the mode bit TPC_EGMODE, thereby producing a control signal Csig2 corresponding to the two-edge detection mode or one-edge detection mode.

The reason why the detection mode is arranged to be switchable is as follows.

In some cases, the one-edge detection mode is effective for a liquid crystal panel 2 with a large CR load involved therein. Reference to the timing diagram of FIG. 11, the detection modes will be described more concretely. The increase in CR load of the liquid crystal panel 2 requires that a longer gradation control period "c" should be set and as such, in some cases sufficient length of time cannot be ensured for the detection periods "ba" and "bb" In the case of the two-edge detection, it is necessary to set the detection periods "ba" and "bb" so as to be nearly equal to each other (ba≅bb). If the detection periods "ba" and "bb" are made shorter, touch signals which can be acquired can become smaller. In contrast, in the case of the one-edge detection method, the detection period "ba" for a rising edge can be set to a larger value because the detection period "bb" can be set to a value nearly equal to zero (bb≅0) If the detection period "ba" can be set to a large value, the time for one detection can be secured. Therefore, the one-edge detection method has a disadvantage that the number of detections is decreased, but in some cases, more touch signals can be acquired in comparison to the two-edge detection method consequently.

Which of the two-edge detection method and the one-edge detection method allows the acquisition of more touch signals depends on the setting of the gradation control period "c" of the liquid crystal panel 2, i.e. CR load of the liquid crystal panel 2. Therefore, it is desired that the touch panel controller 1 is capable of switching between detection modes. In view of the circumstances de scribed above, the detection mod is arranged so that it can be readily switched between the one-edge detection mode and the two-edge detection mode by the register setting as shown in FIG. 12.

FIG. 13 shows, by example, the action timing when the one-edge detection mode is adopted. In this embodiment, the switches CAF1, CAF2 are fixed in ON state, and the switches CFB1, CFB2 are fixed in OFF state. The period "a" says in the non-detection state as described with reference to FIG. 11, and the period "b" stays in the state of waiting for detection. The switch SW3 is controlled so as to stay in OFF state in a gradation control period "c" of the liquid crystal panel 2, and stay in ON state in a control period of the touch panel 1 for the purpose of avoiding noise input from the liquid crystal panel 2, as described with reference to FIG. 11. In the case of using a touch panel 1 without such a noise problem, it is also possible to control the switch SW3 to stay in ON state all the time.

Now, the waveform of the output voltage VOUTn of the integration circuit 301 when the one-edge detection is performed will be described with reference to FIG. 14. The upper row portion from the top of FIG. 14 shows a waveform of the output voltage VOUTn when a touch signal is small. The lower row portion of the drawing shows a waveform of the output voltage VOUTn when a touch signal is large. In either portion of the drawing, a solid line shows a waveform of the output voltage VOUTn in the no-touch condition, and a thin line shows a waveform of the output voltage VOUTn in the touched condition. In FIG. 14, reference voltages VADCREFH and VADCREFL used in the AD conversion circuit 304 are set as follows VADCREFH=4.0 V; and VADCREFL=GND (0 V). In this case, 4 V, which is the upper limit of the input range of the AD conversion circuit 304 is a rough standard, and the precharge voltage VHSP is set to 4.0 V. Then, making correction so that the output voltage VOUTn of the integration circuit 301 is about 0.5 to 1.0 V in the no-touch condition, the output voltage VOUTn can be caused to transition towards the higher potential side according to the strength of the touch, and the contact area of a touched portion. Now, it is desired to set the sensitivity of the integration circuit 301 so that the output voltage VOUTn never exceeds the high-potential side reference voltage VADCREFH even when a touch signal is quantitatively maximum. For instance, even when a large touch signal is produced like the waveform of the output voltage VOUTn shown in the lower row portion of FIG. 14, it is desired that the output voltage VOUTn becomes 3.0 to 3.5 V.

In the case shown in FIG. 14, the detecting action is performed on condition that the pulse number of the drive pulse Ym used for one detection is four, for the sake of simplicity, but the pulse number of the drive pulse Ym used in one detecting action is actually e.g. 32. In this case, the rising edge of the drive pulse Ym arises 32 times and therefore, the detecting action is performed 32 times in one-edge detection.

The embodiment described above has the following effect and advantage.

(1) By using the two-edge detection mode, the number of signal accumulations can be increased in comparison to the case of using only one edge of a drive pulse to perform a detecting action on the assumption that the length of time during which signals are accumulated is common to them; in the two-edge detection mode, detection data is created by accumulating, in terms of absolute value components, signals which are input through the detection terminal PXn in synchronization with rising and falling changes of a drive pulse Ym, and which alternately change in polarity. Further, to achieve the same number of accumulations, the detection time can be shortened. Therefore the device as described above contributes to the shortening of the touch-detection time of a touch panel and to the increase of the accuracy of touch detection.

(2) Combinations of switching circuits CFA1, CFA2, and CFB1, CFB2 for switching the connection of the integration capacitance Cs between the inverting input terminal(−) and the output terminal (VOUTn) of the operational amplifier AMPit which the integration circuit 301 includes are adopted; the connection of the switching circuits is switched immediately before the change of a drive pulse. As a result, signals arising on the detection electrodes capacitively coupling with the drive electrodes at rising and falling edges of the drive pulse change in a direction of increase and a direction of decrease. The operation of accumulating the changes as signal components in terms of absolute value components can be realized readily by a simple means, i.e. the switching of the connection of a integration capacitance between the input and output of the integration circuit.

(3) In the action of detecting a touch and no touch, an initial voltage of the output terminal VOUTn of the integration circuit 301 is set to a voltage close to a center value of the input range of the analog-to-digital conversion circuit 304, whereby the drive voltage VHSP to the detection electrode Xn can be made roughly one-half of that in the case of the one-edge detection. Therefore, an electric field formed between a common electrode which each liquid crystal display cell of the liquid crystal panel 2 connect to, and the detection electrodes becomes smaller. For instance, in the case of a liquid crystal panel 2 of IPS (Registered Trademark) type, the electric field becomes smaller in a direction of the thickness of the panel and therefore, it is useful to prevent the electric field from impairing the shutter function of the liquid crystal.

(4) In the case of driving each drive electrode with more than one pulse and terminating the driving at a falling edge of the pulse, a signal voltage in the no-touch condition which is obtained by the integration circuit 301 is located on a lower side of the input range of the analog-to-digital conversion circuit; and a signal voltage in the touched condition which is obtained by the integration circuit 301 is higher than that in the no-touch condition, and equal to or under the upper limit of the input range of the analog-to-digital conversion circuit. In the case of driving each drive electrode with more than one pulse and terminating the driving at a rising edge of the pulse, the relation of signal voltages can be made reverse. Whether to terminate the driving of a drive electrode by more than one pulse at a rising edge of the drive pulse or a falling edge thereof can be specified can be specified by the mode register 320 using a software program.

(5) Mounting the touch panel controller 3 and the liquid crystal panel controller 4 in combination on a semiconductor device 101, 102 can enhance the convenience of a semiconductor device equipped with the touch panel controller 3 in view of a usage form in which a touch panel 1 is used together with a liquid crystal panel 2.

(6) With the time-division driving of the touch panel 1 and a liquid crystal panel 2, the noise resistance of the action of detecting a touch and no touch can be increased without causing any changes in scan pulses and gradation voltage signals which drive the liquid crystal panel 2 in the middle of the detecting action of the touch panel 1. Even if the time-division driving shortens the time for detecting a touch and no touch, a required amount of signals can be ensured as long as the detection is performed in the two-edge detection mode. In the two-edge detection mode which can achieve double the number of detections in the one-edge detection mode, the semiconductor device retains a capacity enough to adapt to even further shortening of the time for detecting a touch and no touch according to the time-division driving owing to the increase in resolution of a liquid crystal panel. Therefore, the semiconductor device is suitable for use in combination with a high-resolution liquid crystal panel.

(7) The switch SW3 for separating the integration circuit 301 and the detection electrode PXn from each other is provided and as such, even if the detection electrode Xn receives noise from the liquid crystal panel 2 during a non-driving period of the drive electrode, namely a non-detection period of the touch panel 1, the noise is prevented from being transmitted to the detection circuit 310. Thus, it becomes possible to suppress an undesired change of the integration signal in the course of integration owing to the noise.

(8) The semiconductor device is arranged to be able to select the two-edge detection mode and the one-edge detection mode. Thanks to the arrangement, in the case of driving the touch panel 1 and the liquid crystal panel 2 according to a time-division method, even if the liquid crystal panel 2 has a larger drive load, and the detection period of the touch panel 1 is short, and thus a required integration signal amount cannot be ensured, the time required for the switches CFA1, CFA2, CFB1, CFB2 can be assigned to the integrating action as long as the one-edge detection mode is selected. Therefore, the increase of an integration signal amount can be expected in some cases.

(9) Since the subprocessor 5 uses the rewritable mode register 320 to specify which of the two-edge detection mode and the one-edge detection mode to select, the selection of the two-edge detection mode and the one-edge detection mode can be made through a software program.

The invention is not limited to the above embodiments. It is obvious that various changes and modifications may be made without departing from the subject matter thereof.

For instance, as described above, the touch panel controller 3 and the liquid crystal panel controller 4 may be formed in one chip. Also, the touch panel controller 3, the liquid crystal panel controller 4 and the subprocessor 5 may be formed in one chip. The adoption of the two-edge detection mode increases the number of setting items for the control register 320. Take into account the fact, the latter one-chip structure is advantageous. The touch panel 1 and the liquid crystal panel 2 may be formed as separate parts. Otherwise, they may be united into an in-cell structure. Further, a glass-covering integration structure into which the touch panel 1 and a glass cover to set on a top face of the touch panel are united may be adopted.

The touch panel 2 is not limited, in electrode shape, to a rhombic form as shown in FIG. 2 by example, which may take a grid structure.

While the description presented with reference to FIG. 3 is on the assumption that the liquid crystal panel 2 has resolution of VGA (480 RGB×640), and is manufactured based on a-Si(amorphous silicon), the resolution of the liquid crystal panel 2 may not be VGA. In addition, a material of the liquid crystal panel not limited to a-Si, and LTPS (Low-temperature Poly Silicon) may be used. The display panel is not limited to a liquid crystal panel 2. The display panel may be a display panel which performs gradation control with the voltage level, e.g. an organic EL (OLED).

The touch panel controller is limited to one having the two-edge detection mode and the one-edge detection mode which are arranged to be selectable. Such touch panel controller may be one which has only the two-edge detection mode as a detection mode.

What is claimed is:

1. A semiconductor device comprising:
a touch panel controller connected with a touch panel having a plurality of drive electrodes, a plurality of detection electrodes, and a plurality of capacitance components formed at intersections of the drive and detection electrodes,
wherein the touch panel controller comprises
a plurality of drive terminals connected with the plurality of drive electrodes;
a drive circuit operable to output a drive pulse from the plurality of drive terminals;
a plurality of detection terminals connected with the plurality of detection electrodes;
a detection circuit operable to create detection data by accumulating signals input through each detection terminal in synchronization with change in the drive pulse; and
a control circuit operable to control an action of detecting a touch and no touch by use of the drive circuit and the detection circuit, and
wherein the detection circuit has a two-edge detection mode for creating detection data by accumulating, in terms of absolute value components, signals which are input through each detection terminal in synchronization with rising and falling changes of the drive pulse respectively and alternately change in polarity.

2. The semiconductor device according to claim 1, wherein the detection circuit comprises:
an integration circuit configured to integrate a signal input through each detection terminal; and
an analog-to-digital conversion circuit configured to convert an analog signal resulting from the integration by the integration circuit into a digital signal to produce the detection data,
wherein the integration circuit has an operational amplifier, an integration capacitance, and a switching circuit configured to invert a connection of the integration capacitance between an inverting input terminal of the operational amplifier and an output terminal thereof by switching the connection of the integration capacitance between the inverting input terminal of the operational amplifier and the output terminal thereof, and
wherein the control circuit switches the connection of the switching circuit immediately before rising and falling changes of the drive pulse.

3. The semiconductor device according to claim 2, wherein an initial voltage of an output terminal of the integration circuit in the action of detecting a touch and no touch is a voltage close to a center value of an input range of the analog-to-digital conversion circuit.

4. The semiconductor device according to claim 3, wherein when a capacitance component of the intersection has been reduced by a touch, multiple-pulse driving is performed on the drive electrodes by a drive pulse, and the driving is terminated at a falling edge of the pulse, to cause a signal voltage obtained in the integration circuit to be equal to or lower than an upper limit of the input range of the analog-to-digital conversion circuit; and
wherein, when the capacitance component of the intersection has not been reduced because of no touch, multiple-pulse driving is performed on the drive electrodes by a drive pulse, and the driving is terminated at a falling edge of the pulse, to cause a signal voltage obtained in the integration circuit to be lower than a signal voltage in the touched condition.

5. The semiconductor device according to claim 3, wherein, when the capacitance component of the intersection has been reduced by a touch, multiple-pulse driving is performed on the drive electrodes by a drive pulse, and the driving is terminated at a rising edge of the pulse, to cause a signal voltage obtained in the integration circuit to be equal to or higher than a lower limit of the input range of the analog-to-digital conversion; and
wherein, when the capacitance component of the intersection has not been reduced because of no touch, multiple-pulse driving is performed on the drive electrodes by a drive pulse, and the driving is terminated at a rising edge of the pulse, to cause a signal voltage obtained in the integration circuit to be higher than a signal voltage in the touched condition.

6. The semiconductor device according to claim 3, further comprising:
a register configured to provide an instruction on which of first and second driving-termination modes should be selected,
wherein in the first driving-termination mode, driving by a drive pulse is terminated at a rising edge of the drive pulse, and in the second driving-termination mode, driving by a drive pulse is terminated at a falling edge of the drive pulse.

7. The semiconductor device according to claim 6, wherein the register is a rewritable register provided in the control circuit.

8. The semiconductor device according to claim 3, further comprising:
a display panel controller configured to output a scan pulse and a signal voltage to scan and signal electrodes of a display panel respectively, wherein the display panel has a plurality of liquid crystal display cells disposed at intersections of the scan and signal electrodes.

9. The semiconductor device according to claim 8, wherein the control circuit controls the drive pulse in timing of change so that a timing of when the scan pulse changes and a timing of when the signal voltage changes are included in a period between rising and falling edges of the drive pulse.

10. The semiconductor device according to claim 9, further comprising:
a separation switch configured to separate the detection circuit from the detection terminal in every predetermined period including a timing when the scan pulse changes and a timing when the signal voltage changes.

11. The semiconductor device according to claim 2, wherein the control circuit is configured to detect a touch and no touch by
initializing an inverting input terminal of the operational amplifier and its output terminal using a first voltage supplied, as a reference voltage, to a non-inverting input terminal of the operational amplifier;
providing the drive electrode with a drive pulse with a predetermined pulse number;
switching connection of the integration capacitance with a timing immediately before an edge change of the drive pulse; and
converting, by the analog-to-digital conversion circuit, a signal subjected to integration by the integration capacitance in synchronization with each edge change of the drive pulse into a digital signal to create detection data.

12. The semiconductor device according to claim 1, wherein the detection circuit further has a one-edge detection mode in which detection data is created by accumulating a signal input through the detection terminal more than one time in synchronization with any one of a rising change and a falling change of the drive pulse, and
wherein the semiconductor device further comprises a register configured to instruct which of the two-edge detection mode and the one-edge detection mode to select.

13. The semiconductor device according to claim 12, wherein the register is a rewritable mode register provided in the control circuit.

14. An electronic device comprising:
a touch panel having a plurality of drive electrodes, a plurality of detection electrodes, and a plurality of capacitance components formed at intersections of the drive and detection electrodes;
a touch panel controller connected with the touch panel; and
a processor connected with the touch panel controller, wherein the touch panel controller comprises a plurality of drive terminals connected with the plurality of drive electrodes;
a drive circuit operable to output a drive pulse from the plurality of drive terminals;
a plurality of detection terminals connected with the plurality of detection electrodes;
a detection circuit operable to create detection data by accumulating signals input through each detection terminal in synchronization with change in the drive pulse; and
a control circuit operable to control the action of detecting a touch and no touch by use of the drive circuit and the detection circuit,
wherein the detection circuit has a two-edge detection mode for creating detection data by accumulating, in terms of absolute value components, signals which are input through each detection terminal in synchronization with rising and falling changes of the drive pulse respectively and alternately change in polarity, and
wherein the processor calculates, based on the detection data, a coordinate point of a position on the touch panel where the touch panel is touched.

15. The electronic device according to claim 14, wherein the detection circuit comprises:
an integration circuit configured to integrate a signal input through each detection terminal; and
an analog-to-digital conversion circuit configured to convert an analog signal resulting from the integration by the integration circuit into a digital signal to produce the detection data,
wherein the integration circuit has an operational amplifier, an integration capacitance, and a switching circuit configured to switch the connection of the integration capacitance between an inverting input terminal of the operational amplifier and an output terminal thereof by switching the connection of the integration capacitance between the inverting input terminal of the operational amplifier and the output terminal thereof, and
wherein the control circuit switches the connection of the switching circuit immediately before rising and falling changes of the drive pulse.

16. The electronic device according to claim 15, wherein an initial voltage of an output terminal of the integration circuit in the action of detecting a touch and no touch is a voltage close to a center value of an input range of the analog-to-digital conversion circuit.

17. The electronic device according to claim 16,
Wherein, when a capacitance component of the intersection has been reduced by a touch, multiple-pulse driving is performed on the drive electrodes by a drive pulse, and the driving is terminated at a falling edge of the pulse, to cause a signal voltage obtained in the integration circuit to be equal to or lower than an upper limit of the input range of the analog-to-digital conversion circuit; and
wherein, when the capacitance component of the intersection has not been reduced because of no touch, multiple-pulse driving is performed on the drive electrodes by a drive pulse, and the driving is terminated at a falling edge of the pulse, to cause a signal voltage obtained in the integration circuit to be lower than a signal voltage in the touched condition.

18. The electronic device according to claim 16,
Wherein when a capacitance component of the intersection has been reduced by a touch, multiple-pulse driving is performed on the drive electrodes by a drive pulse, and the driving is terminated at a rising edge of the pulse, to cause a signal voltage obtained in the integration circuit to be equal to or higher than a lower limit of the input range of the analog-to-digital conversion circuit; and wherein, when the capacitance component of the intersection has not been reduced because of no touch, multiple-pulse driving is performed on the drive electrodes by a drive pulse, and the driving is terminated at a rising edge of the pulse, to cause a signal voltage obtained in the integration circuit to be higher than a signal voltage in the touched condition.

19. The electronic device according to claim 16, further comprising:

a register configured to provide an instruction on which of first and second driving-termination modes should be selected, wherein in the first driving-termination mode, driving by a drive pulse is terminated at a rising edge of the drive pulse, and in the second driving-termination mode, driving by a drive pulse is terminated at a falling edge of the drive pulse.

20. The electronic device according to claim 19, wherein the register is provided in the control circuit and is rewritable for the processor.

21. The electronic device according to claim 16, further comprising:

a display panel having a plurality of liquid crystal display cells disposed at intersections of the scan and signal electrodes;

a display panel controller configured to output a scan pulse and a signal voltage to scan and signal electrodes of a display panel respectively, wherein the touch panel is an in-cell touch panel disposed in the display panel.

22. The electronic device according to claim 21, wherein the control circuit controls the drive pulse in timing of change so that a timing of when the scan pulse changes and a timing of when the signal voltage changes are included in a period between rising and falling edges of the drive pulse.

23. The electronic device according to claim 22, further comprising a separation switch configured to separate the detection circuit from the detection terminal in every predetermined period including a timing when the scan pulse changes and a timing when the signal voltage changes.

24. The electronic device according to claim 15, wherein the control circuit is configured to detect a touch and no touch by initializing an inverting input terminal of the operational amplifier and its output terminal using a first voltage supplied, as a reference voltage, to a non-inverting input terminal of the operational amplifier;

providing the drive electrode with a drive pulse with a predetermined pulse number;

switching connection of the integration capacitance with a timing immediately before an edge change of the drive pulse; and converting, by the analog-to-digital conversion circuit, a signal subjected to integration by the integration capacitance in synchronization with each edge change of the drive pulse into a digital signal to create detection data.

25. The electronic device according to claim 14, wherein the detection circuit further has a one-edge detection mode in which detection data is created by accumulating a signal input through the detection terminal more than one time in synchronization with any one of a rising change and a falling change of the drive pulse, and wherein the semiconductor device further comprises a register configured to instruct which of the two-edge detection mode and the one-edge detection mode to select.

26. The electronic device according to claim 25, wherein the register is a mode register provided in the control circuit, and is rewritable for the processor.

* * * * *